May 16, 1944.  W. H. KOPITKE  2,349,176
MACHINE FOR EXTRUDING AND BLOWING PLASTICS
Filed Feb. 12, 1941   14 Sheets-Sheet 2

Inventor
William H. Kopitke
By Brown & Parham
Attorneys

Witness
W. B. Thayer

May 16, 1944.  W. H. KOPITKE  2,349,176
MACHINE FOR EXTRUDING AND BLOWING PLASTICS
Filed Feb. 12, 1941  14 Sheets-Sheet 3

Witness
W. B. Thayer

Inventor
William H. Kopitke
by Brown & Parham
Attorneys

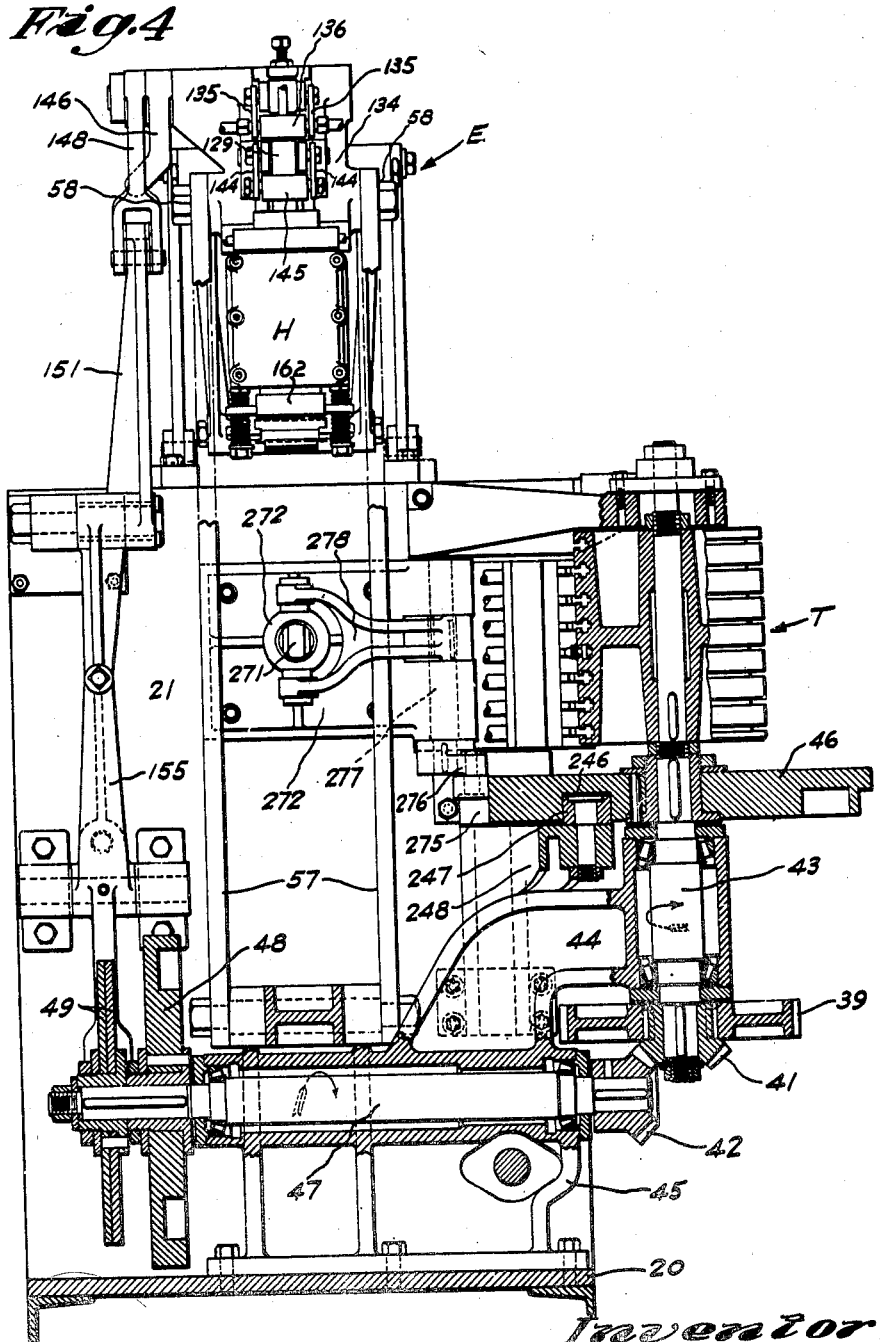

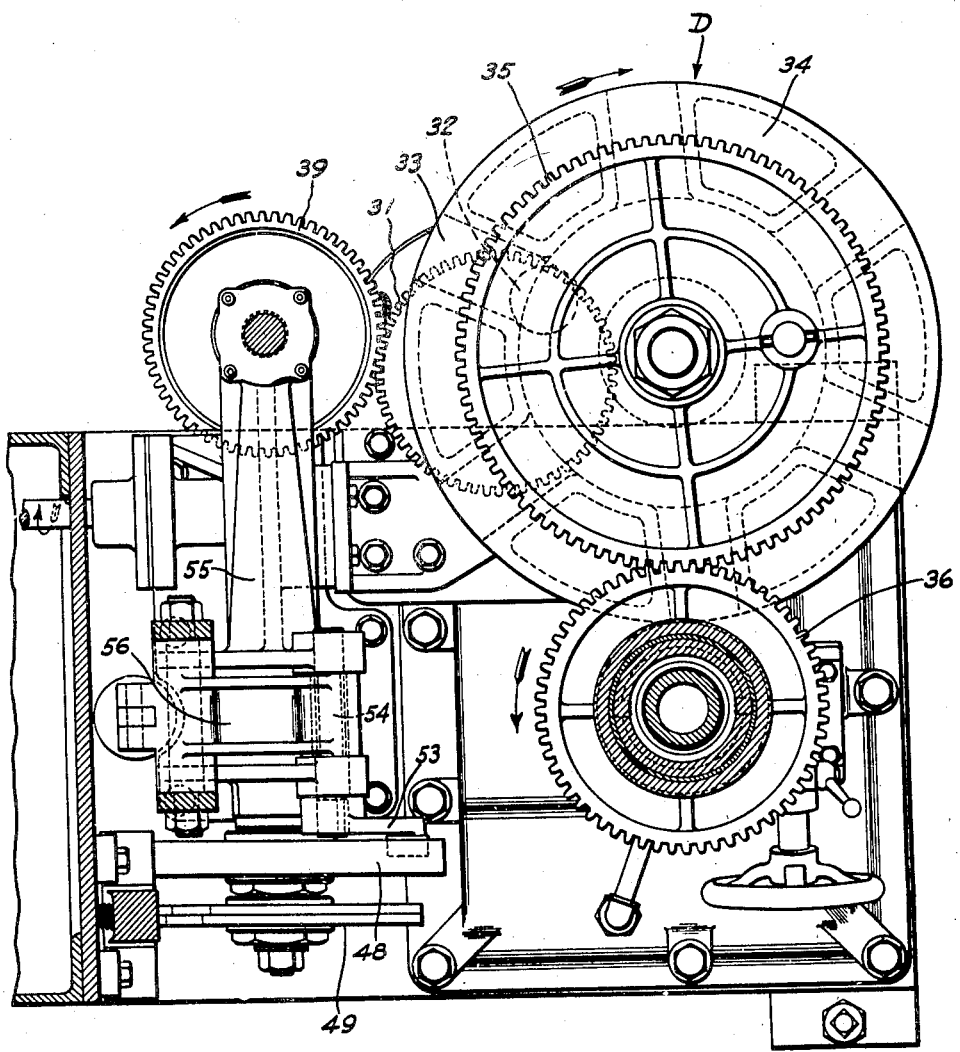

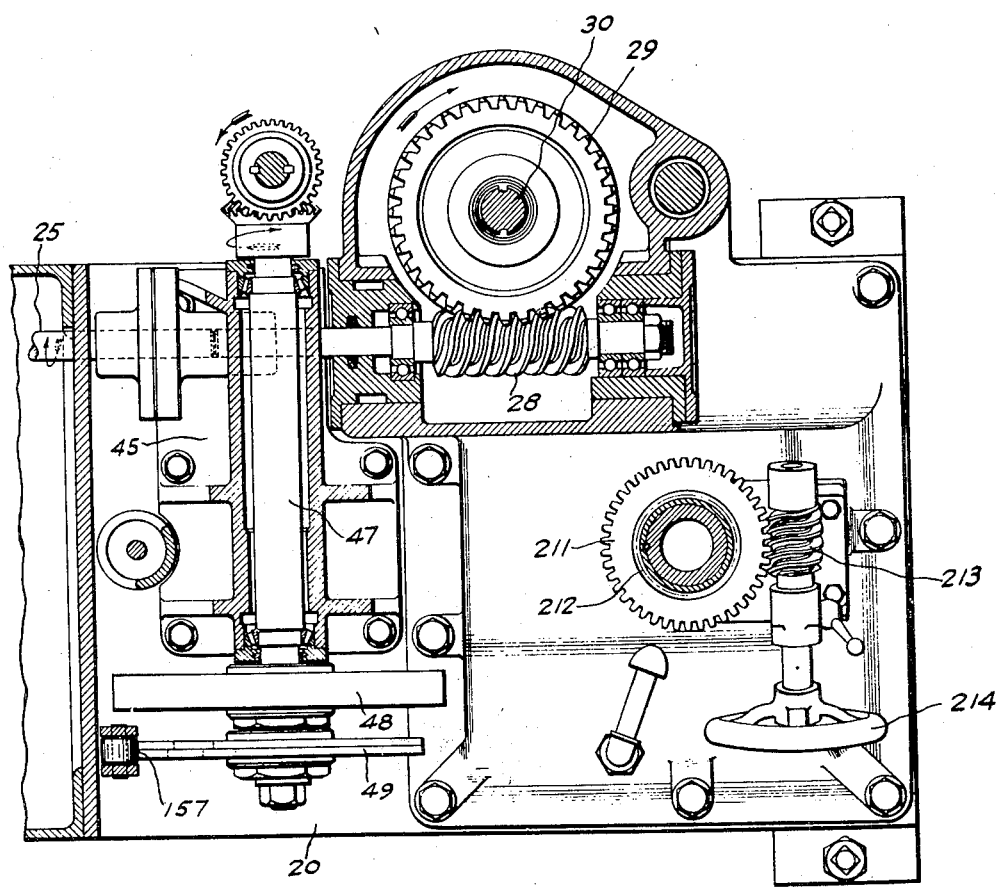

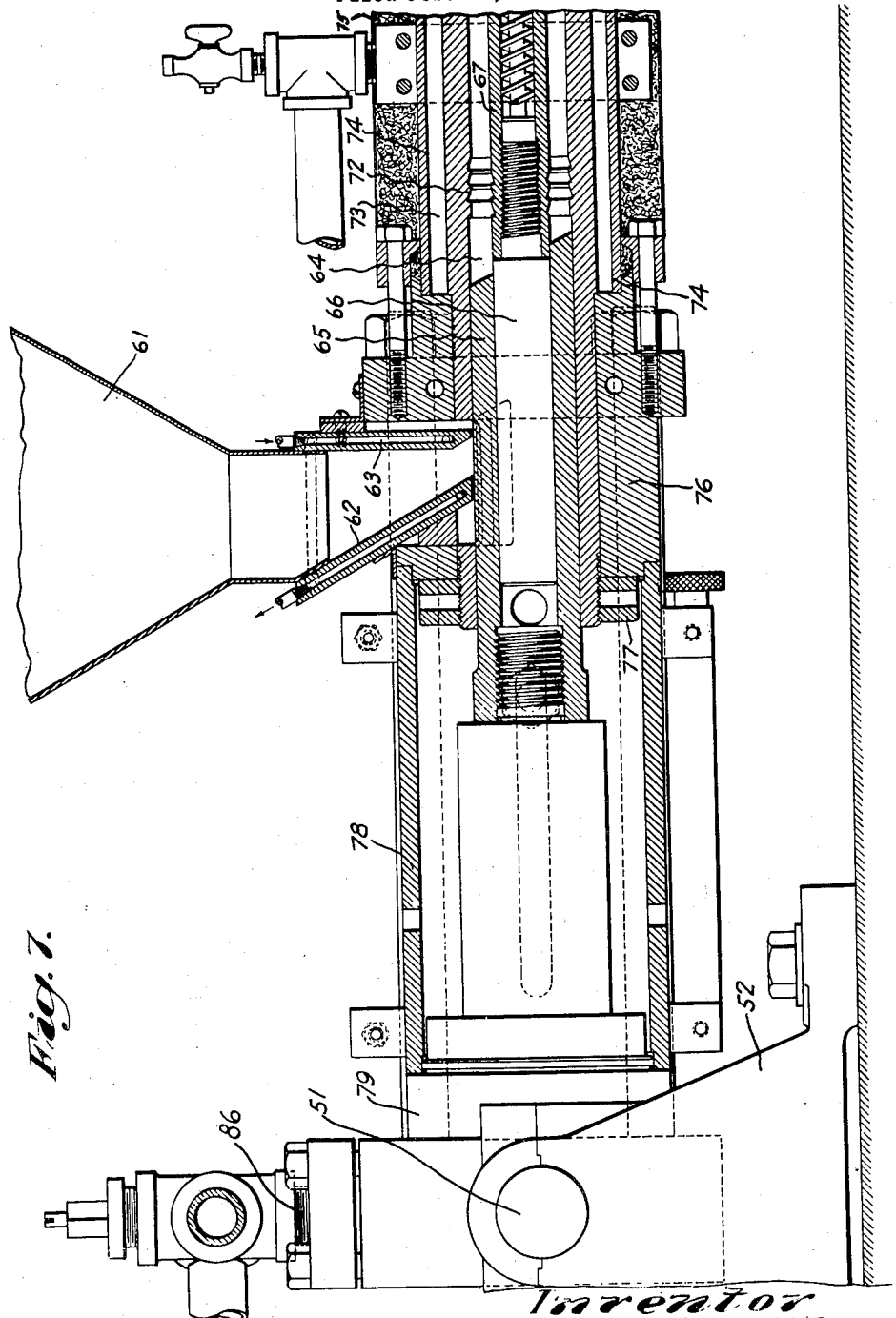

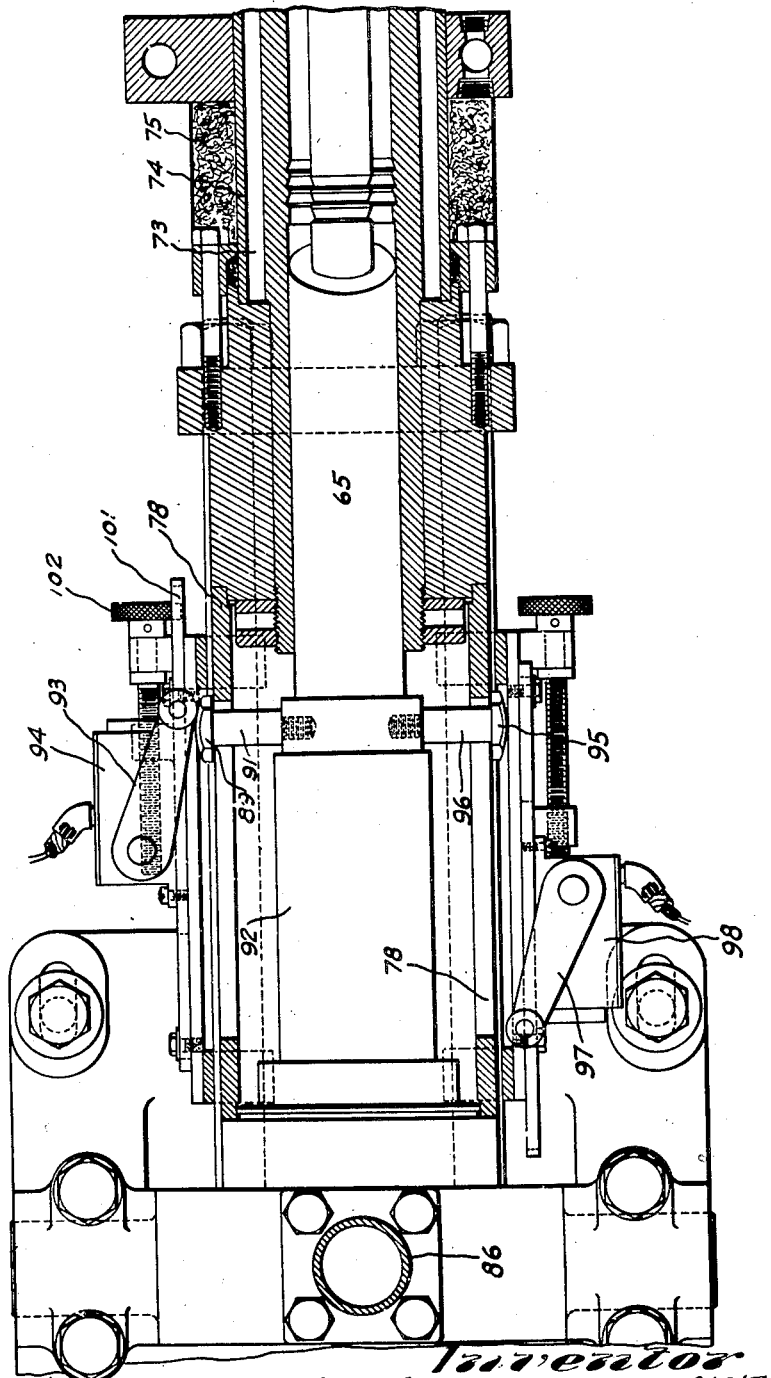

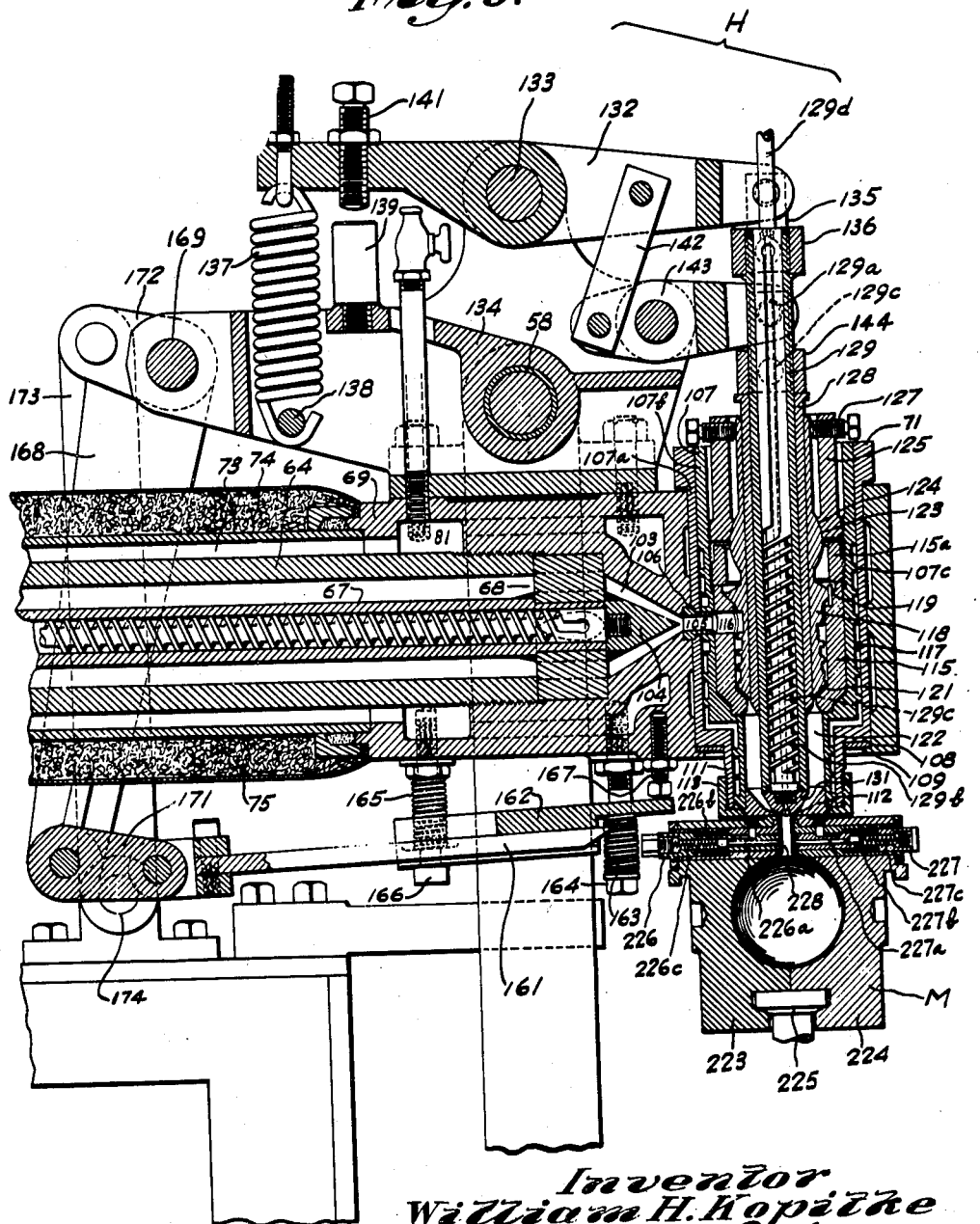

May 16, 1944.  W. H. KOPITKE  2,349,176
MACHINE FOR EXTRUDING AND BLOWING PLASTICS
Filed Feb. 12, 1941  14 Sheets-Sheet 10
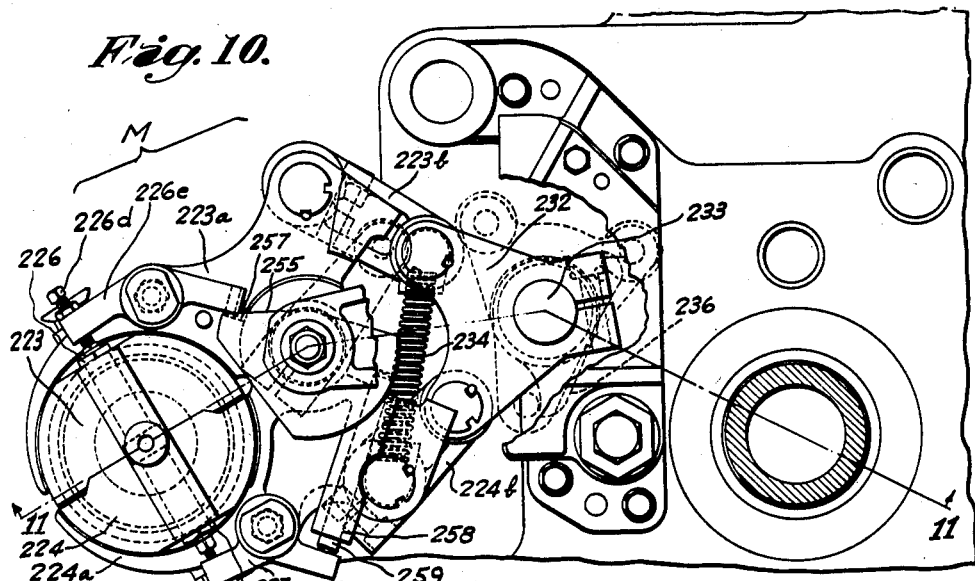
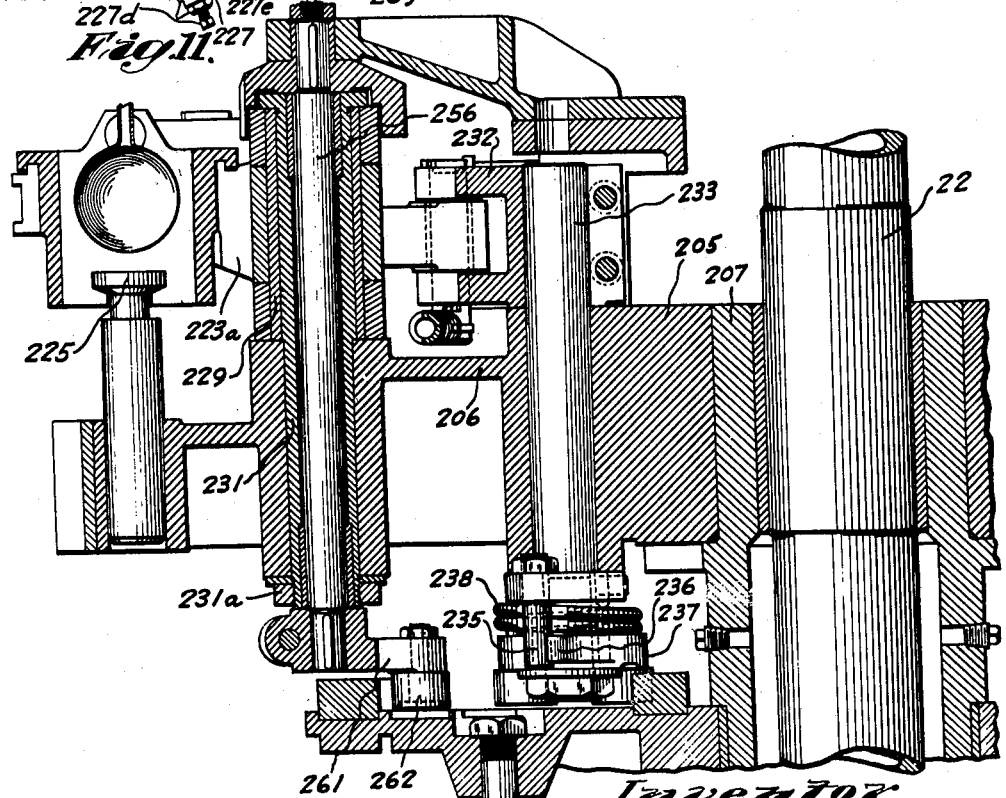
Inventor
William H. Kopitke
by Brun & Parham
Attorneys
Witness
W. B. Thayer

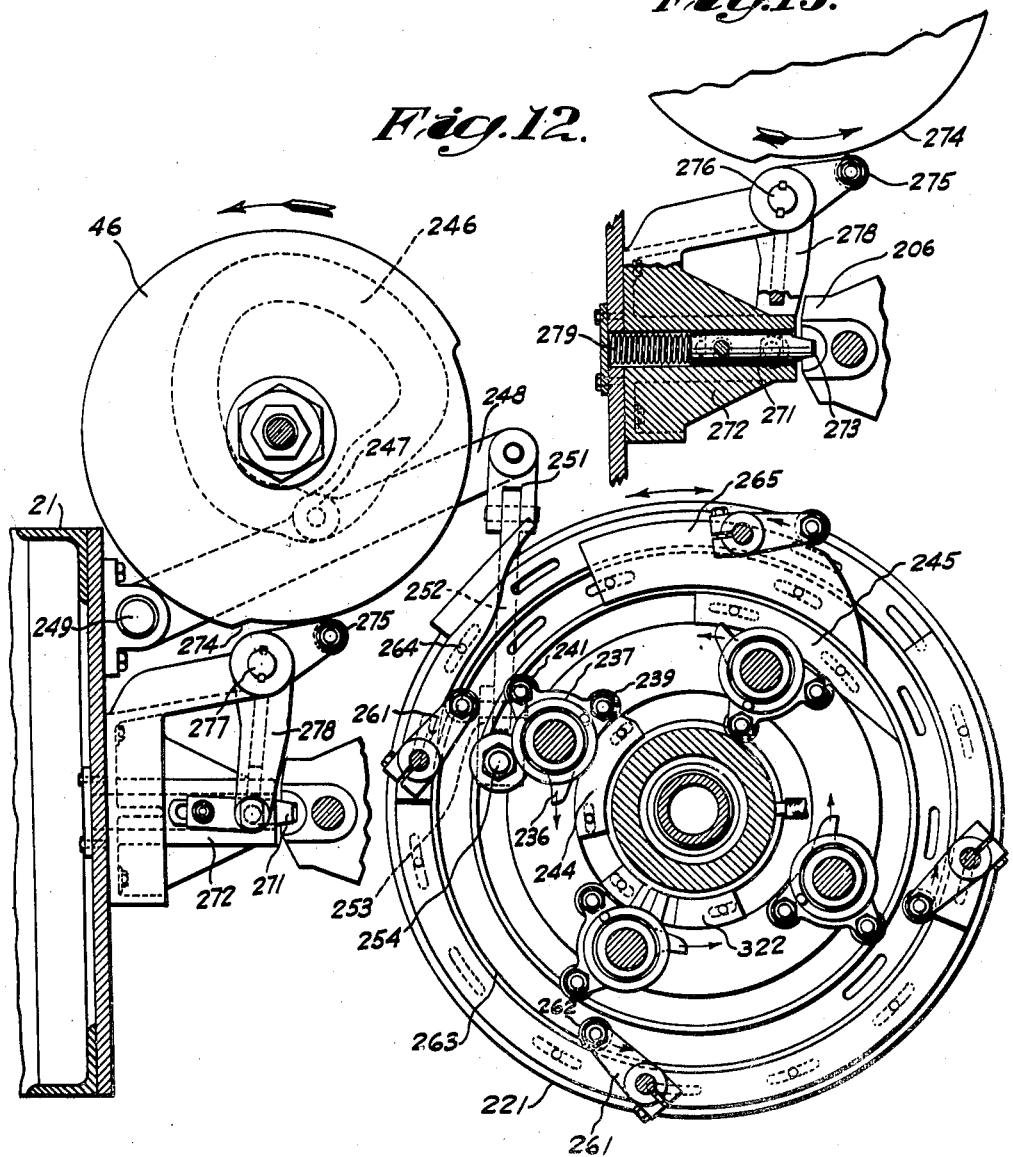

May 16, 1944.  W. H. KOPITKE  2,349,176
MACHINE FOR EXTRUDING AND BLOWING PLASTICS
Filed Feb. 12, 1941  14 Sheets-Sheet 12
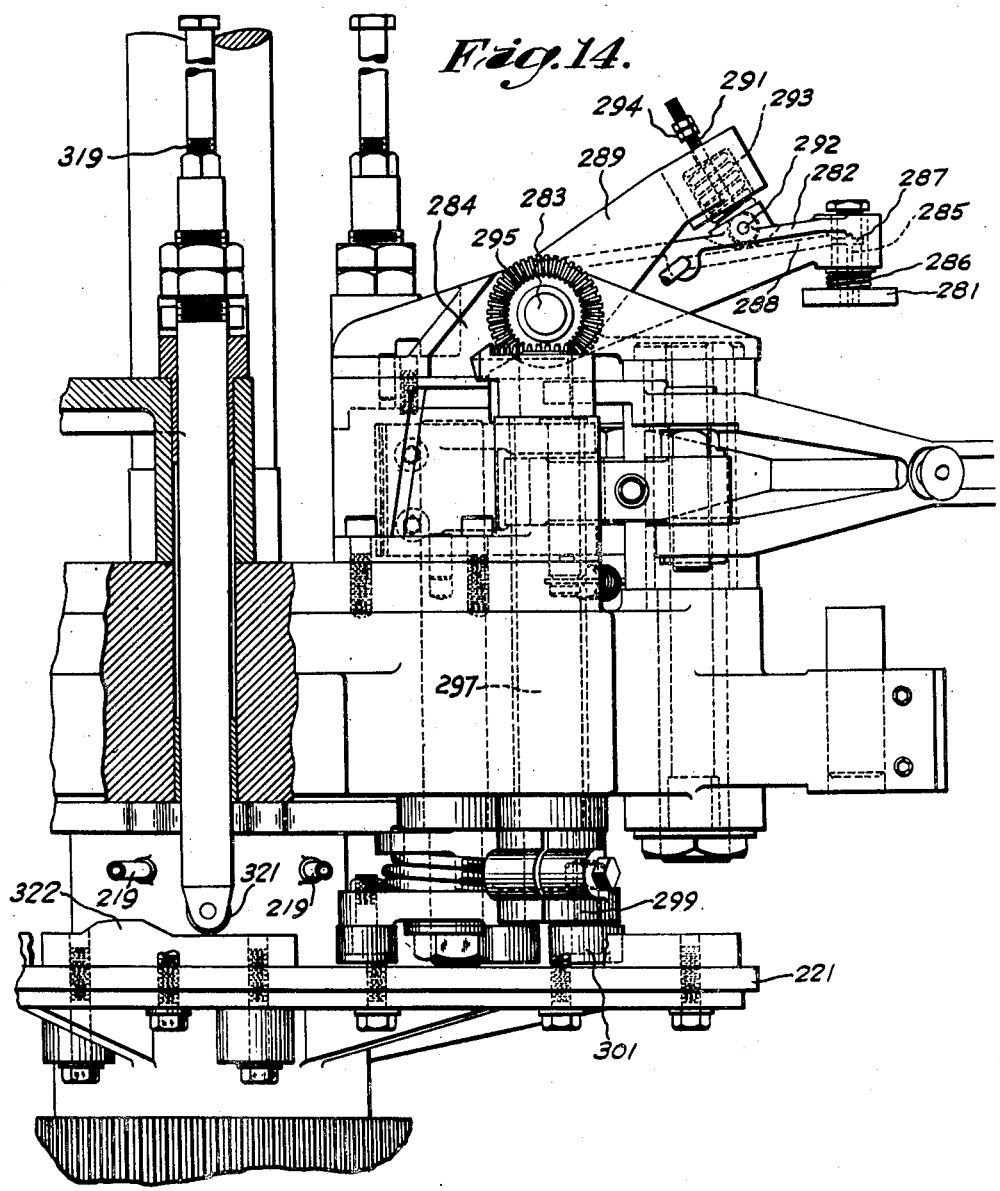

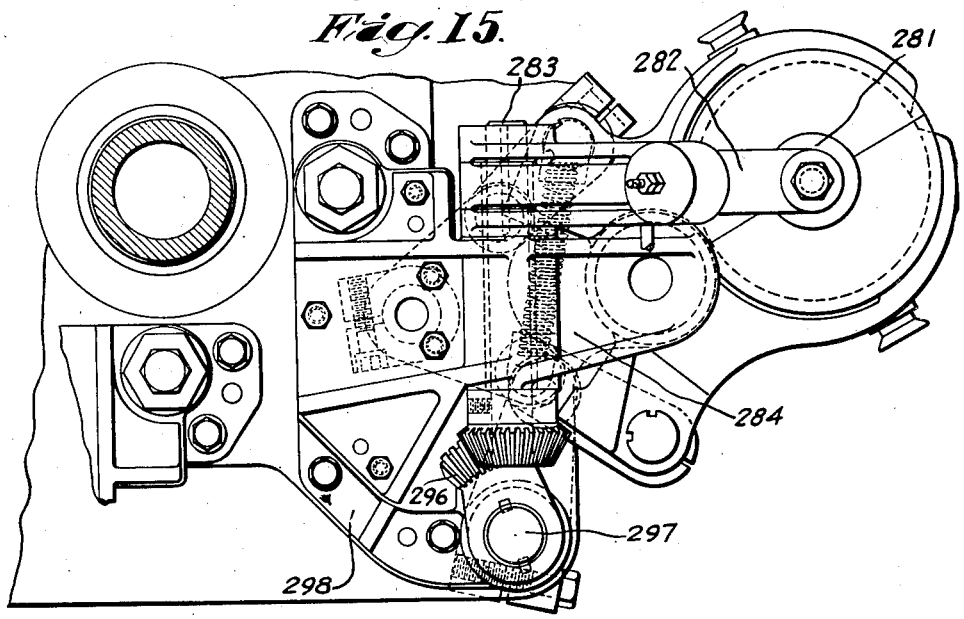
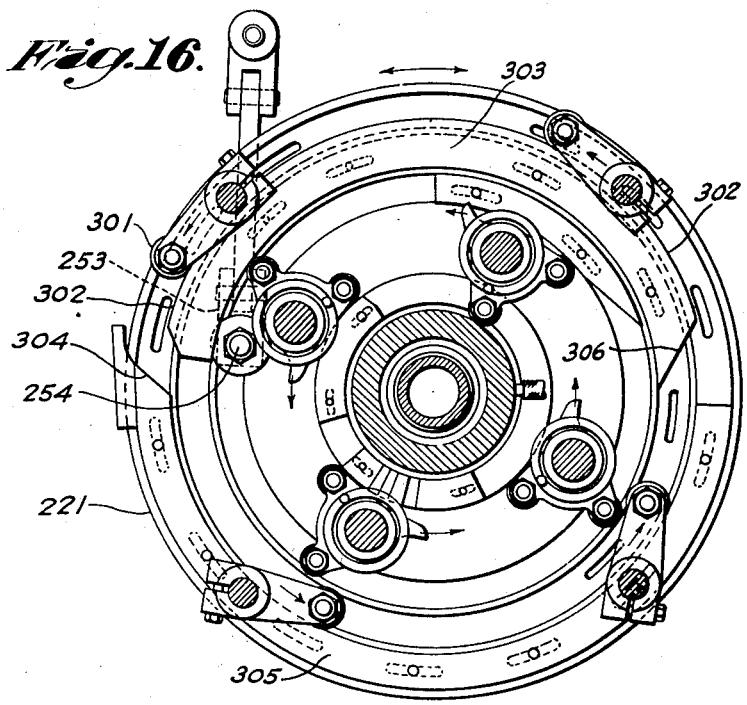

May 16, 1944. W. H. KOPITKE 2,349,176
MACHINE FOR EXTRUDING AND BLOWING PLASTICS
Filed Feb. 12, 1941 14 Sheets-Sheet 14
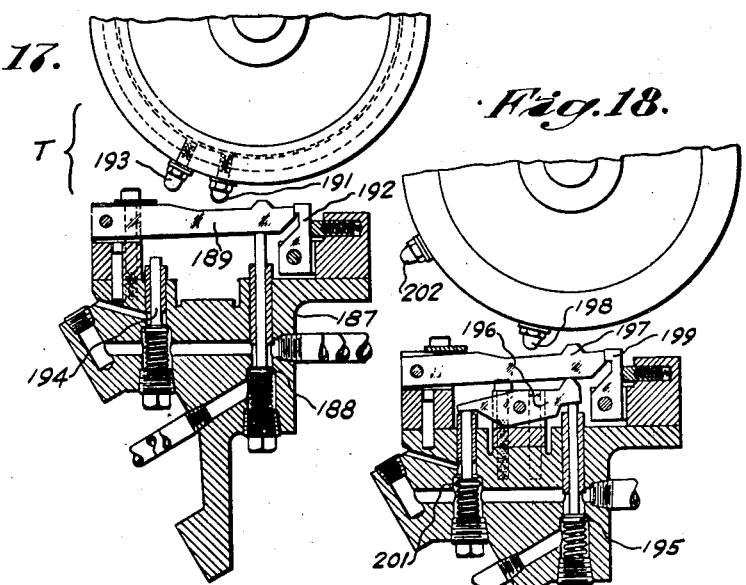
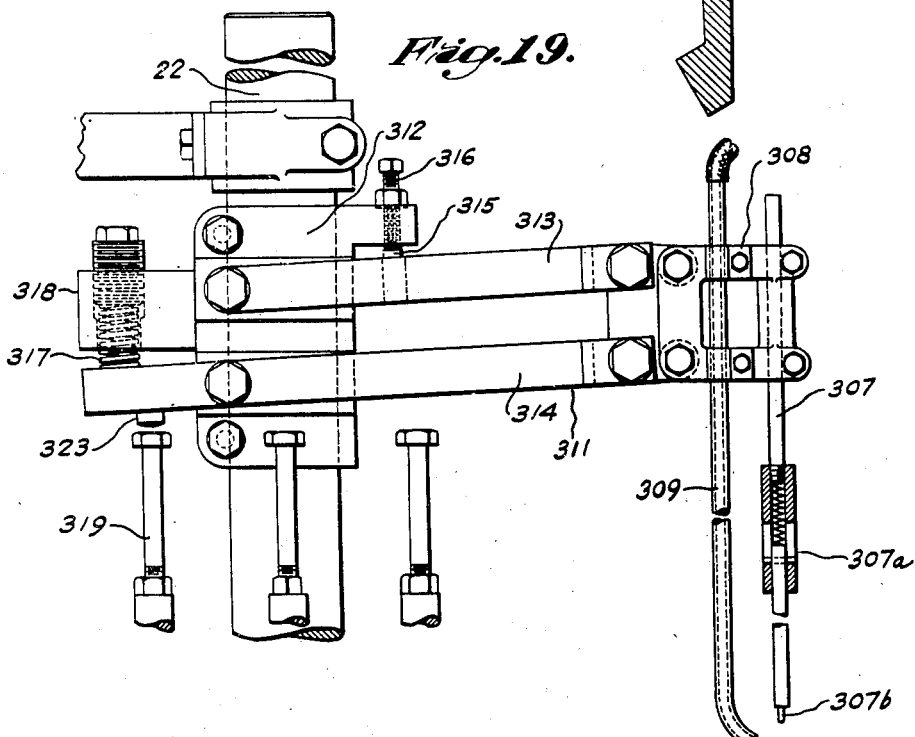
Inventor:
William H. Kopitke
by Brown+Parham
Attorneys
Witness
W.B. Thayer Patented May 16, 1944

2,349,176

UNITED STATES PATENT OFFICE 2,349,176

MACHINE FOR EXTRUDING AND BLOWING PLASTICS

William H. Kopitke, West Hartford, Conn., assignor to Plax Corporation, Hartford, Conn., a corporation of Delaware Application February 12, 1941, Serial No. 378,551

18 Claims. (Cl. 18—5)

This invention relates to machines for extruding and blowing organic plastic materials, hereinafter referred to as plastics, and has for its general object the provision of a new and improved machine of this type by the use of which blown plastic articles may be produced more efficiently.

The machine of the invention embodies some at least of the method and apparatus disclosed in the following United States patents granted to Enoch T. Ferngren, No. 2,128,239, dated Aug. 30, 1938; No. 2,175,053, dated Oct. 3, 1939; No. 2,230,188, dated Jan. 28, 1941; and No. 2,175,054, granted Oct. 3, 1939, to said Ferngren and applicant as co-inventors.

The present application also relates to applicant's copending application, Serial No. 218,057, filed July 8, 1938, Patent No. 2,260,750, granted October 28, 1941, and the present application contains features disclosed in said co-pending application, as well as features of the above listed patents.

Like the apparatus shown in the above patents and copending application, the machine of the present invention operates to form plastics into tubular shape, to close the leading end of the tubular material, to extrude a portion of the tubular material and to blow or expand such extruded portion in a mold and then to sever the blown or expanded article from the remaining tubular material.

Specific objects of the invention are to provide a novel extruding unit, more particularly an extruding unit provided with improved means in the form of a special plunger for assisting in the closing of the leading end of the tubular material formed in the unit; also to provide a novel arrangement of the extruding unit for cooperation with each of a series of blow molds on a rotary carrier; a novel mechanism for effecting operation of a knife in response to movements of the extruding unit as it is moved out and into position for cooperation with the blow mold to sever plastic and retract the knife; novel mold operating mechanism; novel plastic pinching devices associated with the blow molds and actuating mechanisms for said devices, such pinching devices being provided to seal air or other gaseous medium into blown articles of certain types; and novel mechanisms for actuating the parts of the machine in the desired time relation to each other.

Other objects and advantages of the invention will be pointed out in the following detailed description or will become apparent therefrom, said description having reference to the accompanying drawings, in which:

Fig. 4 is a view in vertical sectional elevation taken approximately on the line 4—4 of Fig. 2;

Fig. 5 is a view in horizontal sectional top plan taken substantially on the line 5—5 of Fig. 2;

Fig. 6 is a view similar to Fig. 5 taken substantially on the line 6—6 of Fig. 2;

Fig. 7 is a view on enlarged scale in central vertical section of the rear end portion of the extruding unit E;

Fig. 8 is a view in central horizontal section of the rear end portion of the extruding unit shown in Fig. 7;

Fig. 9 is a view in central vertical section of the front or discharge end portion of the extruding unit E showing details of the extruding head H and associated parts in cooperative relation to one of the blow molds M;

Fig. 10 is a view on enlarged scale in top plan of one of the blow molds and associated mechanism shown in Fig. 3, parts being broken away for clarity in illustration;

Fig. 11 is a view in vertical section taken approximately on the line 11—11 of Fig. 10;

Fig. 12 is a view in horizontal section taken approximately on the line 12—12 of Fig. 2;

Fig. 13 is a partial detail view showing in horizontal section the table locking device shown in Fig. 12;

Fig. 14 is a view in side elevation of a modification of the mold unit M shown in Figs. 10 and 11, the said view being partly in vertical section and illustrating blowhead mechanism not present in the preceding figures;

Fig. 15 is a top plan of the mold unit shown in Fig. 14;

Fig. 16 is a view in horizontal section taken substantially on the line 12—12 of Fig. 2 but showing a modification of the construction shown in Fig. 12 for operation of the blowhead mechanism;

Figs. 17 and 18 are enlarged partial detail views of the timer drum and valves operated thereby; and Fig. 19 is an enlarged partial view in elevation showing a knock-out device for discharging blown articles from the molds of the machine at a delivery station.

Construction in general

Figure 1:
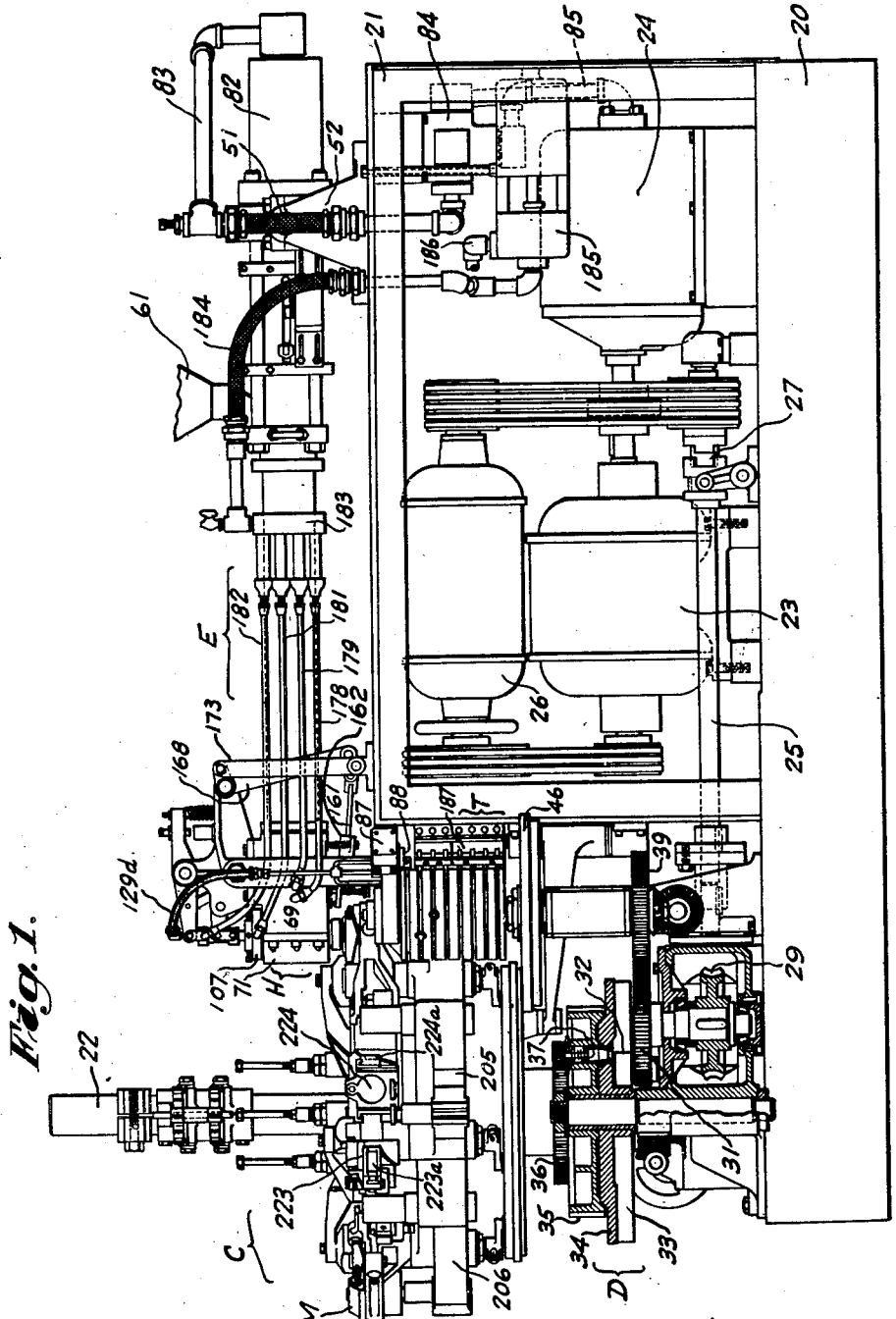
Figure 1 is a view in side elevation of the machine of the invention with side housing cover removed.

Generally considered, the machine of the invention comprises an extruding unit or extruder indicated generally at E (Fig. 1) and having a head H through which tubular material is delivered periodically to each of the molds on the rotary mold carrier, indicated generally at C, the molds being indicated generally at M. The mold carrier C is rotated step by step by a Geneva drive, indicated generally at D. A timer T also is provided which includes valves which control the delivery of air or other fluid for blowing the extruded plastic material and one or more electric switches operated by a constantly revolving timer drum.

The parts referred to above and other parts are carried by the base 20 of the machine on which is mounted a box-like casing 21 on the top of which in turn is mounted the extruding device E, in a manner which will be hereinafter described. The base 20 extends to the left of the casing 21, as seen in Fig. 1, as a platform upon which the rotary mold carrier C is mounted for rotation about a vertical column 22 and this platform also carries other parts of the machine, which are later referred to.

The casing 21 serves as a housing for a motor 23 directly connected to a centrifugal oil pump 24, which supplies oil under pressure for the operation of a ram of the extruding unit E through connections and in a manner hereinafter described. The motor 23 also serves to drive the horizontal drive shaft 25 through a speed reducer 26 and a clutch 27, the shaft 25, as best shown in Fig. 6, being coupled to the worm 28 meshing with worm gear 29 on the shaft 30 of which is mounted a spur gear 31, as shown in Figs. 1, 3 and 5, and which carries the roller 32 of the Geneva drive D.

Figure 2:
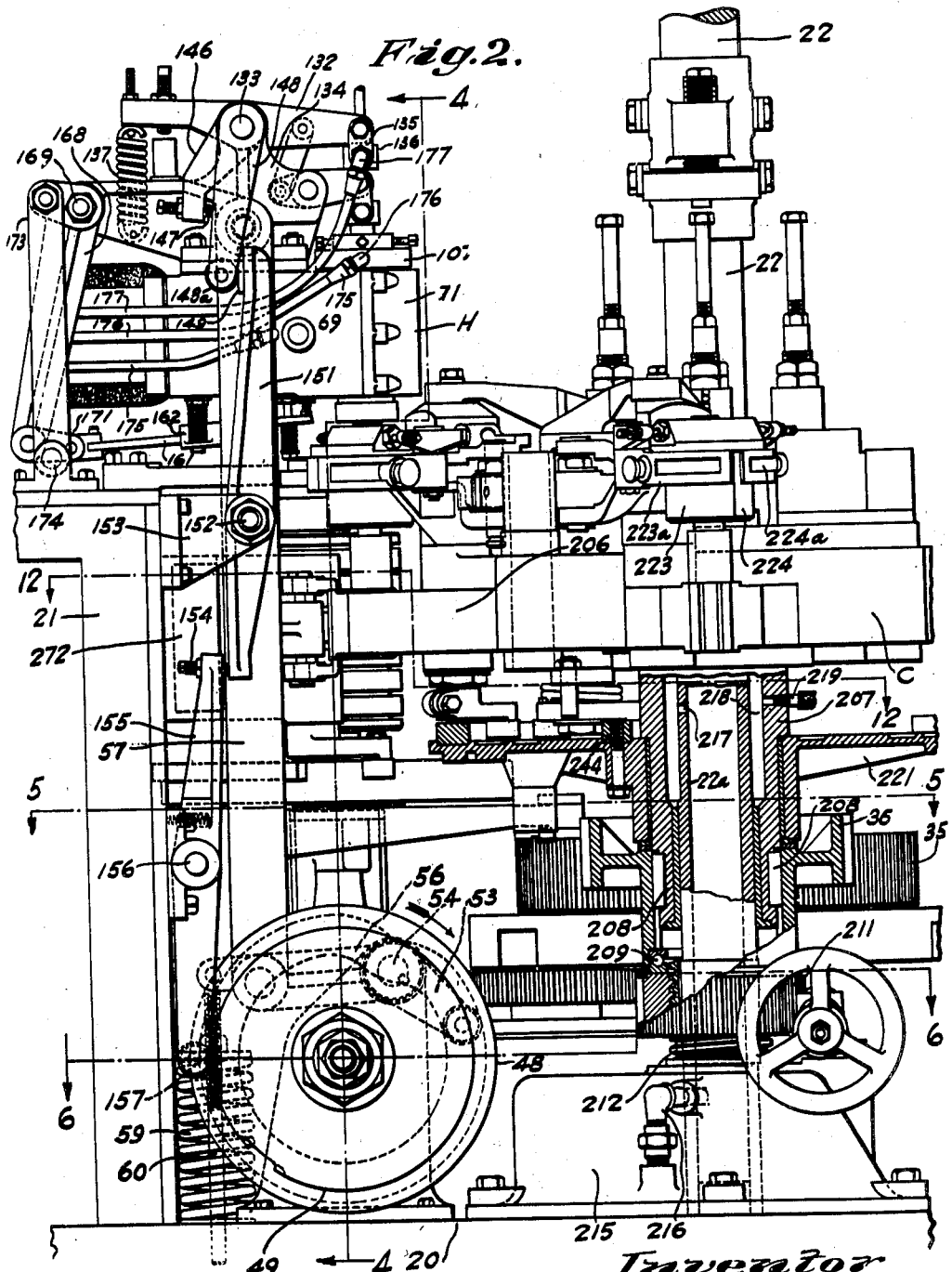
Fig. 2 is an enlarged side elevation partially in section of the front end portion of the machine shown in Fig. 1, looking from the other side of the machine.
Figure 3:
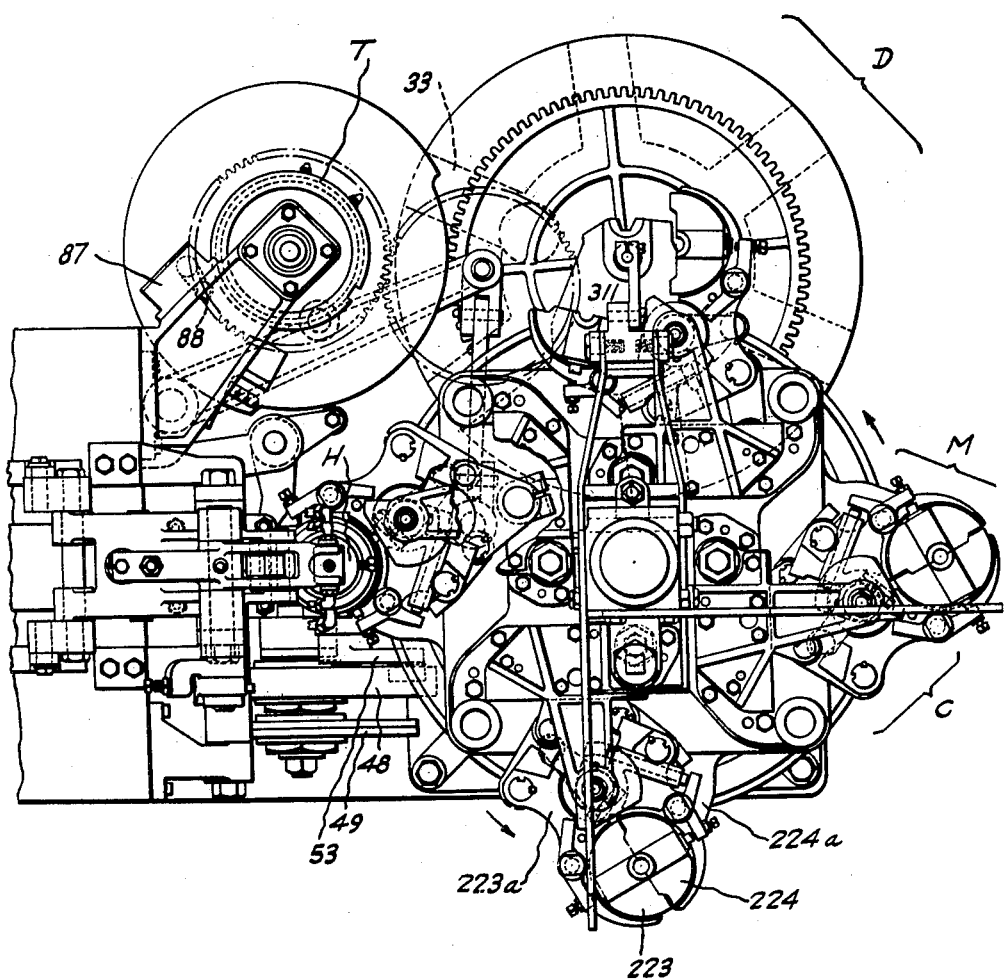
Fig. 3 is a view in top plan of the portion of the machine shown in Fig. 2.

The roller 32 operates successively in each of the six slots 33 of the Geneva wheel 34, Figs. 1, 3 and 5, to which is connected a bull gear 35 meshing with a smaller gear 36 on the hub of the rotary carrier C (see particularly Fig. 2). The gear 35 is connected to the Geneva wheel 34 by means of a pin 37, Fig. 1. Thus the carrier C is moved step-by-step to carry the molds into and out of position beneath extruder head H.

The spur gear 31 meshes with another spur gear 39, Figs. 1, 4 and 5, on the hub of a bevel gear 41 meshing with bevel gear 42. Bevel gear 41 is mounted on the bottom end of shaft 43 of timer T, Fig. 4, journaled in a bracket 44 rising from a casting 45 on the base 20. Timer shaft 43 carries the timer drum, as shown, and also carries and serves to drive a cam 46, which cam operates mold opening and closing mechanisms, plastic pinching devices, and a lock for the mold carrier, all as hereinafter explained.

Bevel gear 42, Fig. 4, is mounted on the transverse horizontal shaft 47 which at its opposite end carries cams 48 and 49 (see also Figs. 2 and 3). The cam 48 serves to raise and lower the extruding unit E periodically and cam 49 serves to operate an air tube and valve member in the extruding head, all as hereinafter explained.

Construction of the extruder E

The construction of the extruder E may best be understood by reference to Figs. 1, 7, 8 and 9.

The extruder E comprises an elongate casing made up of various parts forming generally a tubular construction, the rear end portion of which carries horizontal trunnions 51 pivoted in the brackets 52 to permit an up and down movement of the forward end portion or head H of the extruder. This movement as stated above is effected by the cam 48 which oscillates a crank 53, Figs. 2 and 5, on shaft 54 journaled in bracket 55 and on which is made fast another crank 56, the free end of which is bolted between the bottom ends of bars 57. The upper ends of bars 57 have pivotal connections with the extruder head H, as indicated at 58, Figs. 2, 4 and 9. Downward movement of the head H under control of cam 48, is cushioned by a compression spring 59 through a rod 60 connected to crank arm 56, as shown in Fig. 2.

The extrusion unit E carries a hopper 61, Fig. 7, fitting between the water-cooled plates 62 and 63 and through which plastic passes into a heated cylinder 64 of the extruder. The plastic is forced through the cylinder by means of a tubular piston 65 which fits over the rear end portion 66 of a heated internal core 67.

The internal core 67 extends centrally through the cylinder 64, being guided at its rear end portion by the tubular piston 65 into which it fits and being mounted at its front end portion near the discharge end of the extruder in a perforated collar 68, Fig. 9. The collar 68 is fitted into casting 69, being held therein by the screw threaded end portion of cylinder 64, which is screw threaded into the casting. The casting 69, together with another casting 71, form the head H of the extruder and provide a mounting for the extrusion nozzle, as hereinafter explained.

The tubular piston 65, when in its rearmost position, permits plastic material supplied through hopper 61 to flow into the cylinder 64 and when the piston is moved toward the discharge end of the extruder, the plastic material is forced through the cylinder in which it is heated externally by the cylinder wall and internally by the core 67. The cylinder 64 is grooved, as indicated at 72, Fig. 7, to hold the plastic material against back flow when the piston 65 is retracted.

A space 73, Figs. 7, 8 and 9, for heating medium is provided around the cylinder by a jacket 74 which may be insulated as indicated at 75. At its rear end, the jacket 74 fits against a tubular casting 76 within which fits cylinder 64. The casting 76 carries the hopper 61 and cooling plate 62 and 63, as shown in Fig. 7, and a nut 77 threaded on the end of the cylinder bears against the casting 76. Also fitted to the casting 76 is a tubular guide and supporting member 78. At its forward end the jacket 74 fits into the casting 69, as shown in Fig. 9, and the space 73 communicates with channels in casting 69, such as indicated at 81, through which heating medium flows, as hereinafter explained.

The piston 65 is reciprocated by a ram (not shown) in cylinder 82, Fig. 1, to the outer end of which cylinder is connected a pipe 83, which leads from an electrically-controlled valve at 84, which receives pressure fluid from the centrifugal pump 24 through a conduit indicated at 85. Through pipe 83 the pressure fluid, such as oil, is admitted to and exhausted from the outer end of the ram cylinder and a similar pipe or conduit is partly shown at 86, Fig. 7, for admission of pressure fluid to and from the other end of the ram cylinder under control of valve 84.

To control valve 84 a starting switch 87, Figs. 1 and 3, is located adjacent the drum of timer T, said switch being actuated by its arm 88, a roller on which is contacted at appropriate times by a button (not shown) on the timer drum. This starts the ram and hence the piston 65 in a forward or feeding direction and this movement is stopped when the head 89 of bolt 91, Fig. 3, on the connecting rod 92 of piston 65, strikes the arm 93 of a reversing switch 94. The reversing switch 94 actuates the valve at 84 to stop the forward feeding movement of the piston 65 and to start it moving on its retracting stroke, which stroke continues until the head 95 on another bolt 96 strikes the arm 97 of a limit switch 98. Both switches referred to are mounted on the tubular support 78 and each is carried by a slide, which in the case of the switch 94 is shown at 101, which slide can be adjusted in either direction along the side of the extruder by means of a thumb screw 102. By adjusting the switches, the limits of the stroke of the piston 65 may be varied. It will be understood that in lieu of either of the switches 94 and 98, switches similar to switch 87 may be located adjacent the timer T for operation by buttons thereon and in fact, it is preferred that such a switch be employed for ending the feeding movement of the ram and the movement of the piston 65 and for starting the retraction thereof at the desired times. Preferably the stroke of the piston 65 is so regulated as to insure the extrusion of charges of plastic of uniform weight so that the articles formed therefrom will be uniform in weight.

*The extrusion head and associated parts*

The extrusion head H may best be understood by reference to Fig. 9, which shows the head in central vertical section on an enlarged scale, although the head also is shown in side elevation in Figs. 1 and 2, in top plan in Fig. 3, and in front elevation in Fig. 4.

The purpose of the extrusion head is to receive plastic which has been softened to the desired working condition as a result of its passage through the cylinder 64. So receiving the heat-softened plastic, the extrusion head serves to transform the solid stream of material which it receives into tubular form, to extrude the material in tubular form after it has operated to close the leading end of the tubular material so that air may be admitted thereinto to expand the material into a hollow article.

Referring to Fig. 9, it will be seen that plastic material flows from within the cylinder 64 through the perforations in the collar 68 into a conical passage 103 through and over the conical member 104 located within the outer end portion of the casting 69, thence as a solid stream through passage 105 formed in a nipple 106 fitted partly into the casting 69 and partly into a double walled extrusion tube 107.

The extrusion tube 107 is made of two parts 107a, which is the outer part and is clamped between castings 69 and 71, and the inner part 107b. The inner part 107b is provided exteriorly with a double thread, indicated at 107c, to receive incoming and outgoing streams of temperature controlling fluid, such as hot oil admitted and exhausted through connections later to be described.

The extrusion tube 107 at its bottom end rests upon a washer 108, which in turn rests upon an in-turned flange 109 formed in the extrusion head castings and through the washer 108 projects the reduced nozzle portion 111 of the extrusion tube. In the end of this nozzle portion is mounted an orifice ring 112 held in position by a threaded bushing 113. The orifice ring 112 contains an orifice through which the plastic flows in tubular form, as shown, and which determines the final diameter of the tubular material at the point of issue. Within the extrusion tube 107 is a thimble 115 held in place by a threaded bushing 115a and having a passage 116 in line with the passage 105 so that the plastic when under pressure may flow into the interior of the thimble and downwardly within and over the edge of a helical thread 117 formed on a sleeve member 118 and having a substantially conical bearing surface on the upper end of the thimble, as shown at 119, in the manner described in more detail in my co-pending application Serial No. 218,057. The plastic is thus formed into a thin tubular shape and the tube is further shaped and reduced in thickness as it is forced through the narrow conical passageway at 121 into the space 122 in the nozzle portion of the extruding tube where the tube is substantially thickened. It will be understood that piston 65 in the extruder E forces the plastic through the passages in the head H through the discharge orifice.

The sleeve 118 has a spherical surface at 123 fitting a similar surface at 124 in the bottom end of a bushing 125 threaded into the upper portion of the extrusion tube 107. The bushing 125 carries four equidistantly spaced screws 127 which bear against the upper end of the sleeve member 118 and by properly adjusting these screws, the sleeve member may turn on its spherical surface to adjust the parts carried thereby relative to the parts fixed in the head and which respectively coact with the first named parts. Thus, the air tube 129 is adjusted to center it in the orifice of ring 112 to control distribution of plastic in the tube which is formed in the head.

Within the tubular plunger 128 slides the air tube and valve member 129. The tip 131 of the valve member is shaped to regulate the flow of plastic through the orifice with which it cooperates when lowered. When the valve is raised, the tubular plunger 128 is lowered to force the plastic in the space 122 and beneath the valve member radially toward the center of the orifice in the bushing 112 to close the end of the tube and then to extrude a little surplus material ahead of the closed end which is cut off, as explained below. The plunger 128 is raised by the pressure of piston 65 on the plastic in the head after the air tube and valve has been lowered and extrusion begins.

The valve member 129 is tubular and contains a core 129a, which core has an exterior double thread indicated at 129b for the admission and exhaust of a temperature controlling medium through connections later to be described. Also running through the center of the core member 129a is a passage indicated at 129c for the admission of a fluid pressure medium to the interior of the tubular material while it is being, or after it has been, extruded to expand said material. A conduit 129d leading from timer T connects to the upper end of the passage 129c.

Considering now the mechanism for actuating the air tube or valve 129 and the plunger 128 within the extrusion head, it will be seen by reference to Figs. 2, 4 and 9 that a lever 132 fast on a rock shaft 133 journaled in a casting 134 bolted to casting 69, is connected at its outer end by links 135 to collar 136 secured to the upper end of the valve 129. At its inner end there is connected to the lever 132 one end of a tension spring 137, the other end of which is anchored at 138 to the casting 134. Counterclockwise movement of the lever 132 is limited by a stop 139 on casting 134 which is struck by a screw 141 adjustably mounted in the inner end of the lever.

Connected to the lever 132 outwardly of the rock shaft 133 is a link 142, which in turn connects to the inner end of another lever 143, fulcrumed in casting 134, the outer end of which lever is connected by links 144 to the collar 145 engaging the plunger 128. See Figs. 4 and 9. As a result of these connections between the lever 132 and the plunger 128, when the lever 132 is rocked in a direction to raise the valve 129, lever 143 is rocked in a direction to force the plunger down and when the lever 132 is rocked to lower the valve the lever 133 is rocked to allow the plunger 128 to be raised by the pressure exerted on the plastic by piston 65 as extrusion begins.

The mechanism for so operating the lever 132 includes a crank 146 fast on the rock shaft 133, the adjustable screw 147 of which bears against another arm 148 loose on rock shaft 133 and carrying a roller 148a at its lower end which bears on a pad 149 on the upper end of vertical lever 151 pivoted at 152 in a bracket 153 fastened to the frame 21, as shown in Fig. 2. Bearing against the lower end of lever 151 is the adjustable contact screw 154 in the upper end of another vertical lever 155 pivoted at 156 on the frame 21 and at its lower end carrying a roller 157 which bears against the cam 49 on shaft 47. (See Figs. 2, 4 and 6.)

The tension spring 137 referred to above (see Fig. 2) serves to hold screw 147 in arm 146 in contact with the arm 148; to hold the roller on arm 148 in sliding or rolling contact with pad 149 on lever 151; to hold the lower end of the lever 151 against the screw 154; and to hold the roller 157 on the lower end of the lever 155 against the cam 49. The cam 49 is so shaped that at the proper times and in the desired manner, the lever 132 is rocked thereby to raise and lower the valve and air tube 129 and to simultaneously lower and raise the tubular plunger 128 through the connections which have been described. These operations may occur irrespective of the vertical position of the extrusion head H as the extruder E is moved up and down on its trunnions 51 by the cam 48 because of the sliding contact of roller 148a on the pad 149 of lever 151.

The purpose of moving the extrusion unit E up and down at its discharge end is to raise the nozzle from a mold M to provide sufficient space therebetween to sever the connection between the plastic in the nozzle and the plastic in the mold. The manner in which this is accomplished will now be described.

The plastic severing device

The plastic is severed by means of a knife 161, best shown in Fig. 9, which is held in a slightly upwardly inclined position by a guide plate 162 (see also Figs. 1, 2 and 4) yieldingly held from beneath its forward end by compression springs 163 on bolts 164 and yieldingly held downwardly by rearwardly located compression springs 165 on bolts 166, all of these bolts being screw threaded upwardly into the bottom of the casting 69 and the bolts and springs of each pair being laterally spaced for clearance by the knife. The inclination of the knife is adjusted by means of the screws 164 and 166. A screw 167 threaded into the bottom of the casting 69 just above the outer end portion of the plate 162, Fig. 9, limits upward movement of plate 162 to prevent knife 161 striking the nozzle. The springs referred to provide for yielding engagement of the knife 161 with the bottom of the nozzle portion of the extruder head, which presents a flat surface to the cutting edge of the knife which therefore has a line contact with such surface. The knife 161 operates to clean or shear off all the plastic left on the bottom of the nozzle in the preceding operation; also to sever surplus material extruded ahead of the closed end of the tube by plunger 128 to form a smooth surface on the end. The knife can act to reduce the thickness of the closed end if the air tube and valve 129 is lowered to force the closed end out of the orifice into the cutting plane of the knife.

The tilting movement of the extrusion unit E is utilized to actuate the knife 161 and this is possible because the extruder is raised for the purpose of the cutting operation, which, therefore, may be brought about in response to the raising movement of the extruder. The connections for this purpose comprise a bell crank 168, Figs. 1, 2 and 9, pivoted at its upper end at 169 to an inward projecting portion of the casting 134, the downwardly projecting arm of the bell crank having pivotal connection at its bottom end with the knife through a link 171, and the laterally projecting arm 172 of the bell crank having pivotal connection to the upper end of a vertical link 173 which has a pivotal anchorage at 174 to the frame 21 of the machine.

As a result of these connections, when cam 48 acts through the vertical bars 57 to raise the extruder E on its trunnions 51, the bell crank 168 is rocked counterclockwise, as seen in Figs. 2 and 9, and this projects the knife 161 across the bottom of the nozzle of the extrusion head. Likewise when the cam 48 lowers the extruder E, the bell crank 168 rocks clockwise on its pivot 169 to retract the knife into the position in which it is shown in the several figures.

Oil and air connections for extruder E and head H

As heretofore explained, temperature controlling medium is caused to flow through various passages within the extruding unit to heat the plastic and soften it to working condition and also to assist in shaping the plastic in the desired manner and to maintain it at the desired temperature and viscosity throughout the extruding operation. It is preferred to use oil as the temperature controlling medium and a suitable source of oil and heating means therefor may be provided in the base 20 of the machine, although not illustrated in the drawings.

Oil is held in the reservoir under air pressure and this air pressure forces the heated oil upwardly through an oil supply pipe (not shown) which is connected to the rear end of jacket 74 and thus leads into the rear end of heating space 73 surrounding cylinder 64 through which the oil flows toward head H, and said oil supply pipe also is connected to a hot oil inlet pipe 175 shown in Fig. 2, which leads into the interior of the core 67 at its forward end; to the conduit 176 which leads into the upper end of the double-walled extrusion tube 107 (Fig. 2); and to conduit 177 which leads into the valve 129 at its upper end. Suitable regulating valves, not shown, may be provided for controlling the passage of the hot oil into the jacket for the extrusion cylinder and through the various conduits referred to.

After its circulation through the various interior passages to which the hot oil is lead, as above explained, the oil is discharged through conduits best shown in Fig. 1 and including conduit 178, which leads out of the interior of the casting 69 and thus from within the forward end of space 73; the conduit 179 which leads from within the core 67; the conduit 181 which leads from within the extrusion tube 107; and the conduit 182 which leads from within the air tube and valve 129.

The conduits just recited connect into the header 183 from which the oil flows into conduit 184 leading to the intake of a rotary circulating pump 185 mounted within the casing 21. The discharge line 186 of this pump returns the oil to the reservoir (not shown) in the base of the machine where the oil is further heated and then returned through the heating passages of the extruder, as already explained. Thus, the pump 185 serves to circulate the oil which flows upwardly out of the reservoir and through the apparatus under the pressure of air trapped in the reservoir.

Blowing air or other suitable pressure fluid is admitted to and exhausted from the air tube passage 129c through conduit 129d under control of the timer T. The air may be supplied in various ways: it may for instance be supplied as a low pressure puff which is trapped within the hollow plastic material, or it may be admitted to the interior of the plastic material at high pressure and at a selected time cut off and air in the lines to the air-tube vented to atmosphere. The supply of air here referred to is that which is supplied through the air tube into the interior of the plastic material prior to the time when the knife operates to sever the extruded material contained in one of the molds M from the material remaining in the extrusion head H.

To supply air, and if desired to exhaust it, as explained above, conduit 129 has three branches, as shown in Fig. 1, which are connected to various ports of the valve chest 187 of the timer T. In Fig. 17, a cross-sectional view of the valve chest shows valve mechanism for admitting a puff of air to the air tube 129 and this comprises a spring-pressed, poppet valve 188 which is opened by lever 189 when depressed by a button 191 on the timer drum. Valve 188 is held open by a latch 192 which engages the end of the lever until another button 193 disengages it, ending the puff-blowing operation. In this form of valve construction, another valve 194, which otherwise might be employed as an exhaust valve, merely acts as a check valve to prevent any exhaust of the air. It will be understood that the puff of air will flow past the valve 188 through one of the branches of the air conduit into the line 129d, thence into the interior of the hollow plastic material.

To both admit and exhaust air pressure to and from line 129d, the valve construction shown in Fig. 18 may be employed. In this construction, the poppet valve 195 is depressed by a lever 196 in turn depressed by lever 197 by a button 198 on the timer drum, the lever 197 being latched by a latch 199. When this occurs lever 196 permits exhaust valve 201 to close. After a selected time interval, another button 202 serves to oppositely move the valves 195 and 201 to cut off the flow of air pressure and to exhaust the air remaining in the lines leading into the air tube into the interior of the plastic material, the exhaust occurring past the valve 201. This form of valve construction may be used to blow the hollow plastic material into contact with the walls of the molds under high pressure.

*The mold carrier C, mold M and associated parts*

The mold carrier C, which revolves about the vertical column 22, comprises a spider 205, Figs. 1, 2, 11 and 14, having projections or arms 206 which carry the mold or mold units M. The spider 205 fits onto the upper end of the hub 207, Figs. 2 and 11, which at its lower end is keyed at 208 within the hub of the carrier driving gear 35, which in turn has a bearing at 209 on the upper end of spur gear 211. (See Figs. 2 and 6.) Spur gear 211 is threaded onto a stationary collar 212 keyed to the lower end portion of the column 22, forming with the gear 36 a jack for raising and lowering the carrier C. The raising and lowering of the carrier is effected by means of a worm 213, Fig. 6, meshing with the spur gear 211 and operated by hand wheel 214 for the purpose of adjusting the height of the carrier C and the molds M mounted thereon preferably to slightly clear the bottom of the extrusion head H in its lowermost position.

It will be seen from Fig. 2 that the lower end of the column 22, which is tubular as shown at 22a, fits into a casting 215 secured to the base 20 of the machine. Through this casting 215 leads a conduit 216 from a suitable reservoir of air or other pressure medium, the said conduit communicating with the interior of the tubular or hollow portion 22a of the column, which in turn through one or more ports 217 therein conducts the fluid pressure medium into a chamber 218 formed between the column and the hub of the carrier. From this chamber, the fluid pressure medium may flow through one or more conduits 219, Figs. 2 and 14, to points of distribution on the carrier C, as described hereinafter. This construction provides for the supply of air to points on the carrier C irrespective of the position of the carrier.

Mounted for oscillation on the hub 207 of the carrier C is a cam plate 221 which carries various cam lobes for operating molds and other parts mounted on the carrier C, as will presently be explained.

Any desired number of molds and associated mechanisms may be mounted on carrier C, the present embodiment having four molds or mold units M, and, hence, having four arms or projections 206 formed on the carrier. This requires that the carrier be turned 90° each step and the Geneva drive D moves the carrier accordingly.

The construction and operation of each of the molds or mold units may be identical and hence it will suffice to describe one only of the mold units and this description refers particularly to Figs. 3, 9, 10 and 11.

Referring first to Fig. 9, it will be seen that the mold M is formed in two sections 223 and 224 which meet in a vertical plane and close about a flanged pin 225 mounted in an arm 206 of carrier C. While the interior of the mold may have various shapes, the mold illustrated is adapted to form balls and therefore has a spherical shape with a stem forming portion at its top. In this mold, hollow balls are formed by extrusion and blowing, as shown in Fig. 9, and it is desired to seal air within each ball before the mold moves out of engagement with the nozzle of the extrusion head and to shape the stem of each ball to form an eye therein. For this purpose, opposed plungers 226 and 227, which are tubular in form, are slidably mounted in the respective mold halves 223 and 224, the ends of these plungers being so shaped that when pressed toward each other they will not only close the tubular connection shown at 228 and seal air within the ball, but will form an eye or ring on the stem. To form a hole in the stem, auxiliary plungers 226a and 227a are mounted within the plungers 226 and 227 to be forced toward each other and squeeze the plastic until it is very thin and nearly cut it out of the ring formation. When the ball has been discharged from the machine and the plastic is hardened, this eye material may be readily pushed out to open the eye.

Both the plungers 226 and 227 operate against compression springs 226b and 227b which tend to force the plungers outwardly and the inner piercing plungers 226a and 227a are yieldingly forced outwardly of the plungers within which they are mounted by compression springs 226c and 227c and therefore yieldingly press the plastic in forming the eye in the stem of each article. The plunger devices thus described constitute the plastic pinching means heretofore mentioned.

The sections 223—224 of the mold M are mounted in holders 223a and 224a, Figs. 1, 2, 3, 10 and 11, which holders pivot on the bushing 229, Fig. 11, which in turn is mounted on the sleeve-like hinge pin 231 fitting into an appropriate opening in a projection or arm 206 of the spider 205 and held therein by a nut 231a in its bottom end.

The mold is opened and closed through mechanism which comprises links 223b and 224b, Figs. 10 and 11, connected to bell crank 232 fast on the upper end of vertical rock shaft 233 journaled in the spider 205. Oscillation of rock shaft 233 serves to open and close the mold and if desired the mold may be yieldingly held in open and closed position by means of a dead center spring 234 connected to the inner pivot point of link 223b at one end and to the outer pivot point of the link 224b at the other end, as shown in Fig. 10.

At its bottom end the rock shaft 233 carries a pin 235, Fig. 11, which is engaged by lug 236 of a crank 237 on rock shaft 233 when the crank is turned in a direction to open the mold. When the crank 237 is turned in a direction to close the mold, a yielding connection between the crank and the rock shaft is afforded by a coil spring 238 on shaft 233 and connected at one end to the crank 237 and at the other end to the rock shaft 233. Thus if material accidentally gets between the sections of the mold, injury to the mold or its operating parts is prevented by the yielding connection thus provided.

The mechanism for actuating the mold opening and closing parts so far described includes, in addition to the crank 237, the cam plate 221 previously mentioned and other parts which will now be described. As shown in Fig. 12, each of the cranks 237 has an inner roller 239 and an outer roller 241. On the plate 221 is a cam 244 located in position to engage and force the roller 239 outwardly after the mold unit with which it is associated arrives beneath the extrusion head H and the cam plate 221 is turned clockwise (Fig. 12). This rocks the shaft 233 in a direction to close the mold. As to the mold unit at the delivery position, the outer cam roller 241 is engaged by another cam 245 on the cam plate 221 to rock the shaft 233 in the opposite direction and open the mold, this engagement also resulting from clockwise rotation of cam plate 221.

Clockwise rotation of cam plate 221 also operates the pinching devices as explained hereinafter.

The oscillation of the cam plate 221 is effected by means of cam 46, Figs. 4 and 12, which as already stated is mounted upon the shaft 43 of the timer T. The cam 46 has a cam track 246 in which rides the roller 247 on lever 248 pivoted at its inner end at 249 to the casing 21 and at its outer end connected by a knuckle 251 to link 252 having pivotal connection through another knuckle 253 having pivotal connection at 254 to the cam plate 221.

Considering now the mechanism for operating the pinching plungers 226 and 227 and referring once more to Figs. 10 and 11, it will be seen that the outer ends of the plungers 226 and 227 are engaged by the adjustable contact screws 226d and 227d in the ends of levers 226e and 227e pivoted on the respective mold arms 223a and 224a, as clearly shown in Fig. 10. These arms are oscillated by a rotary member 255 mounted on the upper end of a vertical rock shaft 256, Fig. 11, within the hinge pin sleeve 231 of the mold arms. The member 255 has an outwardly projecting lug 257, Fig. 10, which engages the inner end of the lever 226e and it also has a diametrically located horizontal sleeve 258 which contains a pin 259 engaging the inner end portion of the lever 227e. Thus, when the rock shaft 256 and the member 255 are turned in a clockwise direction, levers 226e and 227e bring pressure upon the outer end portions of the pinching plungers 226 and 227, forcing them inwardly of the mold to pinch the hollow stem or connection and seal the pressure fluid within the hollow article in the mold. When the operation is reversed, the plungers 226 and 227 are permitted to be forced outwardly by their respective compression springs.

The rocking movements referred to are brought about by crank 261, Figs. 11 and 12, clamped on the bottom end of the rock shaft 256 and carrying a roller 262 engaged by cams 264 and 265 on the cam plate 221. The cam 264 moves the pinching plungers into pinching position just before the associated mold moves out of cooperative relation to the extruder head H, this action resulting from the oscillation of the cam plate 221 in a clockwise direction beyond the position into which it previously was moved to close the mold. The cam plate 221 is shown in Fig. 12 about to move further to force in the pinching plungers. The pinching plungers are permitted to move outwardly into release position at the delivery station as a result of the roller 262 being forced outwardly by the cam 265.

It will be understood that the various molds and the associated pinching plungers will be operated successively at the extruding and blowing position and at or near the delivery position as a result of the successive and periodic clockwise rotation of the cam plate 221 bringing into action the various cams carried thereby. The cam plate is turned counterclockwise by its cam track 246 to return it to initial position in readiness for another series of operations as described above. This occurs during a 90° counterclockwise turn of the mold carrier C.

The table lock

Mechanism for locking the table to hold it rigidly in stationary position between step-by-step movements is shown in Figs. 2, 4, 12 and 13. As best shown in Figs. 12 and 13, a horizontal sliding bolt 271 in a casting 272 bolted to the frame 21, is located in position to slide into and out of a vertical slot 273 formed in the outer end portion of each of the arms 206 of the carrier C. The sliding movement of the bolt 271 is caused by the edge portion 274 of cam 46, Fig. 12, engaged by roller 275 on crank 276, Figs. 4 and 12, fast on the lower end of a rock shaft 277 journaled in the casting 272 and on which is made fast another crank 278, the bifurcated end portion of which has pivotal connection with the bolt as shown in Figs. 4, 12 and 13. The outermost part of the cam 274 causes retraction of the bolt 271 from a slot 273 to unlock the table, while the innermost portion of the cam permits a spring 279, acting against the inner end of the bolt, to push the bolt outwardly into locking position in engagement with one of the grooves or slots 273, in which position the bolt is shown in the drawings. It will be understood that the cam is so shaped and its rotation so timed with the carrier drive as to lock and unlock the table at the end of each quarter revolution of the carrier.

The blow head construction and actuating mechanism

In the production of certain types of blown plastic articles such as containers, it may be desirable to supply blowing air to blow the articles during the travel of each of the molds between the position beneath the head H and the delivery position. Thus, after an article is initially formed in a mold by extruding the leading closed end of the tubular material and initially blowing it in the mold and severing the connection, and the mold moves away from head H, blowing air may be applied to the article as it is carried by the mold toward the delivery station.

In Figs. 14 and 15, there is shown blow head mechanism which in identical form may be applied to each of the four molds of the machine and which comprises a blow head 281 slidably mounted in a vertically oscillating arm 282 on a horizontal shaft 283 journaled in a casting 284 on the carrier C. The blow head 281 has a hollow stem 285, Fig. 14, around which is a spring 286 which forces the head away from the arm 282 and moves the port 287 of the passage in the blow head out of registry with the passage 288 in the blow head arm.

When the arm 282 is lowered to bring the blow head into engagement with the mold, the spring 286 is compressed as the head engages the mold, thus bringing the port 287 into registry with the passage 288 and permitting air or other pressure fluid to flow into the interior of a hollow article in the mold. Passage 288 may receive pressure fluid from one of the conduits 219 in the hub 207 of the carrier as previously explained. The blow head arm 282 is lowered and raised by another arm 289 fast on shaft 283, through a rod 291 which passes downwardly through the outer end of arm 289 and is pivotally connected at 292 to the arm 282. The two arms are yieldingly held in spaced relation by a spring 293. When the arm 289 is lowered it yieldingly presses the arm 282 downwardly to move blow head 281 against a mold and when it is raised it engages nut 294 on the rod 291 to raise the blow head 281 out of engagement with the mold.

The lowering and raising movement thus referred to is effected through bevel gear 295 fast on one end of the horizontal shaft 283, meshing with the bevel segment gear 296 fast on the upper end of a vertical rock shaft 297 journaled in a bracket 298 on the carrier C. At its bottom end, the rock shaft 297 carries a crank 299, a cam roller 301 of which rides on the cam surfaces provided on the cam plate 221, which as shown in Fig. 16 is modified for the operation of blow heads in the various molds. The cam roller 301 rides along the outer concentric edge 302 on the cam section 303 until it strikes the end 304 of another cam section 305 which moves the roller inwardly of the cam disc past the adjoining end of the cam section 303. This lowers blow head 281 into operative position through the connections described above. The roller then follows the inner concentric edge portion of the cam 305 until it rides outwardly along the end 306 of the cam section 303 onto the outer concentric edge 302 thereof. This raises the blow head 281 and this may occur at the desired time before arrival of the mold at the delivery position. For example, it may occur as the mold moves away from the third position, which is the position just ahead of the delivery position.

The discharge mechanism

In order to discharge articles from the molds at the delivery station, suitable mechanism may be provided to insure that the articles will be stripped from the molds and discharged from the machine. For the discharge of articles, such as hollow balls, mechanism shown in Fig. 19 may be provided. This comprises a vertical rod 307 held in a clamp 308 in which also is clamped an air tube 309. The clamp 308 is connected to the outer end of a parallel linkage arm indicated generally at 311, which is pivoted to a collar 312 clamped to the upper end of the column 22. This arm comprises the upper link 313 and the lower link 314, the upper link carrying a stop 315 which strikes an adjustable screw 316 in collar 312 as the result of the arm 311 being yieldingly forced upwardly by a compression spring 317 in a lug 318 on the clamp 312, said spring engaging the rearwardly projecting end of the lower link 314 of the arm 311. Thus the rod 307 and the air tube 309 are normally held in upward position.

As shown in Fig. 3, the discharge device is centered over the delivery position of the molds. When a mold arrives at the delivery position and starts to open, the arm 311 is moved downwardly to bring the rod 307 into engagement with the stem portion of one of the hollow articles, the said rod 307 preferably having a yielding joint, as indicated at 307a, to prevent injury to the article and a pointed end, as shown at 307b, to fit into or against the stem portion of the article. This holds the article in central position over the centering pin 225 and may force it into engagement with the top of the pin, thus stripping the article from the mold. Just as the arm 311 moves upwardly a blast of air is admitted to the blow pipe 309 from one of the valves of the timer T and the article is blown into a delivery chute (not shown) and thus discharged from the machine.

The arm 311 is lowered at the appropriate time by one of four vertical push rods 319, which as shown in Figs. 2 and 14 are mounted in the carrier C near its hub. Each of these push rods has a cam roller 321 on its bottom end which rides up cam 322 on the cam plate 221 when the plate is turned in clockwise direction, this raising a push rod 319 to engage its upper end with a pin 323 on the free end 314 of arm 311. This lowers the discharge device and when roller 321 rides downwardly on cam 322, the push rod drops, and spring 317 raises the discharge device to inoperative position clear of the top of the mold which is next moved to delivery position.

Operation

The operation of the entire machine will be understood from the preceding description but the following summary of operations may assist in understanding the invention.

The motor 23, Fig. 1, drives the mold carrier C through the Geneva drive at D, thus imparting a step-by-step movement to the carrier to bring the molds M successively into stationary position beneath the nozzle of the extrusion head H of extruder E. The motor also continuously drives the drum of timer T and cam 46 on the timer shaft which actuates the cam plate 221 on the carrier column and operates the carrier lock; the motor continuously drives the cam 48 on shaft 47 to raise and lower extruder E on its trunnions; and continuously drives cam 49 on shaft 47, which cam actuates the movable parts within the extrusion head H. In addition, motor 23 drives pump 24 which supplies pressure fluid (oil) to ram cylinder 82 of extruder E.

A complete machine cycle consists of four movements of mold carrier C, and for each movement of the carrier the extruder E and associated parts go through a complete cycle of operations in cooperative relation to one of the molds M on the carrier. Therefore, timer T and cams 46, 48 and 49 turn four full revolutions during a single machine cycle.

The various parts of the machine are shown in the drawings in the positions which they occupy when the mold carrier C is at rest with a mold M beneath and in axial alignment with the extrusion nozzle of the extrusion head H (see Figs. 1, 2 and 9) and another mold M at the delivery position.

More exactly stated, the parts of the machine are shown in those positions which they occupy at that period in the machine cycle when the blowing of an article in the mold M at the extrusion position has just been completed, Fig. 9, and just prior to the pinching and sealing of the stem portion of the article by the pinching plungers 226 and 227 in the mold. At this time the air tube and valve 129 is in its lowermost position in, or nearly in, engagement with the orifice of the orifice ring 112 and air pressure will have been turned on by a valve of timer T so that when the pinching devices or plungers seal the stem of the article, air under pressure will be entrapped therein. The pinching devices are now forced inwardly by movement of the cam plate 221 and cam 264, Fig. 12, to seal the air in the article and to shape the stem of the article to form an eye thereon.

The extrusion head H is now raised by cam 48, Fig. 2, and this rocks the bell crank 168 causing the knife 161, Figs. 1, 2 and 9, to move across the bottom of the extrusion nozzle and sever the plastic connecting the stem of the article in the mold M with the plastic in the nozzle. The action of the knife 161 preferably is such as to cut through surplus material on the closed end of the tubular material in the nozzle. The end of the tubular material will previously be closed and the surplus pushed out by the descent of plunger 128 as valve member 129 is raised.

The carrier C is now unlocked by the action of the cam surface 274 on cam 46 which retracts the bolt 271 of the table locking mechanism. The mold carrier is now turned through an angle of 90° to bring another mold M beneath the extrusion head and to move the succeeding mold to the delivery station as the carrier comes to rest.

In the meantime, the extrusion head H will have been lowered by cam 48 and the air tube and valve 129 will have been lowered to regulate the extrusion of material. The leading closed end of the tubular material in the nozzle will have started to extrude, and the tubular plunger 128 will have been forced upwardly, as the result of the forward movement of the piston 65 in the extruder E. Expansion of this extruded material occurs upon the admission of a puff of air from one of the valves of the timer T. These operations are so timed that the expanded tubular material will have developed to a selected shape approximating that of a mold M at about the time or just before the next mold closes around the extruded material.

It will be understood that the air tube 129 and the plunger 128 are actuated at the desired times through connections to the cam 49, Fig. 2, and that the piston 65 will have been actuated by the ram in cylinder 82 under the control of the valve 84, operation of which is timed from the timer T and otherwise as previously explained.

When the mold arrives beneath the extrusion head, the head will have been lowered into the position shown in the drawings and the mold carrier will have been locked by the bolt 271 under control of cam 46, Figs. 12 and 13. The mold now closes about the extruded end of expanded plastic material at the moment it has been extruded and expanded to the desired extent, and timer T operates to admit blowing air to air tube 129 to blow the plastic material into the shape of the mold. The pinching plungers 226 and 227 are now operated by cam 264 on cam plate 221 to close and shape the stem and seal air in the ball. This is followed by raising of head H and cutting action of knife 161 as previously explained as another cycle of the extruder begins.

After the carrier C comes to rest, cam 46 turns cam plate 221 clockwise, Figs. 2 and 12, and this moves cam 244 which closes the mold M at the extrusion station; moves cam 265, Fig. 12, which actuates connections to the pinching plungers 226, 227 of the mold at the delivery station to permit them to retract; moves cam 245 which opens the mold at the delivery station and cam 322, Figs. 12 and 14, which acts on a push rod 319 to operate the discharge device 307—309, Fig. 19, at the delivery position to discharge an article from the machine and moves cam 264 which presses in plungers 226 and 227 at the extrusion station.

Various changes may be made in the details of construction and mode of operation of the illustrated embodiment of the invention without departing from the scope of the appended claims.

The invention is limited to use with organic plastic materials capable of being softened by heat, and of being maintained at a low viscosity by transfer of heat thereto through metal walls without permanently or objectionably sticking to the metal surfaces in order to permit the material to be delivered in heat-softened workable condition, shaped into an article and rigidified. Various types of organic plastic materials meeting the above requirements may be formed into hollow articles of various shapes by the machine of this invention. Such materials may be supplied to the hopper of the machine in a solid state and it is intended that the plastic materials be so delivered to the machine although some materials at least may be delivered to the machine in pre-softened condition.

In the production of hermetically sealed articles containing gaseous medium, such as air under pressure, in the balls illustrated and described, it may be desirable to discharge the articles from the machine before they have been rigidified by cooling in the molds, although the articles may, if desired, be rigidified by cooling in the molds. Such premature discharge from the molds permits a greater use of the molds and a higher rate of production by the machine.

However, if such articles are not rigidified when discharged from the molds, the entrapped gaseous medium will swell or bloat the articles and may burst them. To prevent this, the articles are almost instantly discharged into a cooling bath (not shown), such as water, which quickly rigidifies the articles and prevents distortion thereof by the entrapped gaseous medium. In the machine shown and described herein, a blast of air delivered through pipe 309 of the discharge or knockout device at the delivery position is utilized to blow the articles out of the machine at high speed into a suitable cooling bath (not shown). The cooling bath may be a tub bath in which the articles are immersed or submerged, or a shower bath, which applies water over the surface of each article.

Having thus described my invention what I desire to claim is:

1. A machine for forming articles from organic plastic material comprising an elongate, unitary extruder, said extruder including a heating cylinder, a head at the front end of said extruder, means for forcing plastic material through said extruder to cause said material to be heated and extruded through said head, means including a pivot near the rear end of said extruder for supporting it in horizontal position, a mold carrier having a plurality of molds mounted thereon, means for driving said mold carrier step-by-step to move the molds in an endless path and into and out of a stationary position beneath the head of said extruder to receive plastic material therefrom, and means for periodically tilting said extruder on said horizontal pivot to move said head vertically into and out of a position for cooperation with the molds on said mold carrier.

2. A machine for forming articles from organic plastic material comprising an elongate, unitary extruder, said extruder including a heating cylinder and a head and means for forcing plastic material therethrough and to cause said material to be extruded from said head, means including a pivot near the rear end of said extruder for supporting it in horizontal position, a mold carrier having a plurality of molds mounted thereon, means for driving said mold carriers step-by-step to move the molds in an endless path and into and out of a stationary position beneath the head of said extruder to receive plastic material therefrom, means for periodically tilting said extruder on said horizontal pivot to move said head vertically into and out of a position for cooperation with the molds on said mold carrier, a single motor, and separate driving connections between said motor and the mold carrier driving means and the means for lowering and raising the extruder respectively.

3. A machine for forming articles from organic plastic material comprising an elongate, unitary extruder, said extruder including a heating cylinder and a head and means for forcing plastic material therethrough and to cause said material to be extruded through said head, means supporting said extruder in horizontal position including a pivotal support for said extruder at the end thereof removed from said head to provide for vertical up and down tilting movement of the extruder, a mold carrier having a plurality of molds mounted thereon, means for driving said mold carrier step-by-step to move the molds in an endless path and into and out of a stationary position beneath the head of said extruder to receive plastic material therefrom, means including a cam for tilting said extruder to move the head thereof vertically out of and into position for cooperation with the molds on said mold carrier, and means for rotating said cam in time relation to the movement of said mold carrier.

4. A machine for forming articles from organic plastic material comprising an elongate, unitary extruder, said extruder including a heating cylinder and a head and means for forcing plastic material therethrough and to cause said material to be extruded through said head, means supporting said extruder in horizontal position including a pivotal support for the extruder at the end thereof removed from said head to provide for up and down tilting movement of the said extruder about said pivotal support as a center, and mechanism for causing such up and down tilting movement of the extruder.

5. A machine for forming articles from organic plastic material comprising an extruder, said extruder including a cylinder and a head and means for forcing plastic material therethrough and to cause said material to be extruded through said head, a mold carrier having a plurality of molds mounted thereon, means for driving said mold carrier to move the molds in an endless path and into and out of position beneath the head of said extruder to receive plastic material therefrom, means for lowering and raising the head of said extruder into and out of position for cooperation with the molds on said mold carrier, an air tube and valve member in the head of said extruder, and mechanism for reciprocating said member irrespective of the vertical position of the extruder head.

6. A machine for forming articles from organic plastic material comprising an extruder, said extruder including a cylinder and a head and means for forcing plastic material therethrough and to cause said material to be extruded through said head, a mold carrier having a plurality of molds mounted thereon, means for driving said mold carrier to move the molds in an endless closed path and into and out of position beneath the head of said extruder to receive plastic material therefrom, means for lowering and raising the head of said extruder into and out of position for cooperation with the molds on said mold carrier, a plunger in the extruder head for displacing plastic therein and causing it to flow toward the discharge opening of said head, and mechanism for reciprocating said plunger irrespective of the vertical position of the extruder head.

7. A machine for forming articles from organic plastic material comprising an extruder, said extruder including a cylinder and a head and means for forcing plastic material therethrough and to cause said material to be extruded through said head, a mold carrier having a plurality of molds mounted thereon, means for driving said mold carrier to move the molds in an endless path and into and out of position beneath the head of said extruder to receive plastic material therefrom, means for lowering and raising the head of said extruder into and out of position for cooperation with the molds on said mold carrier, an air tube and valve member positioned in the extruder head, a plunger in the extruder head for displacing plastic therein toward the discharge opening of the said head, and means for oppositely reciprocating the said member and said plunger irrespective of the vertical position of said head.

8. A machine for forming articles from organic plastic material comprising an extruder, said extruder including a cylinder and a head, means for forcing plastic material through said cylinder and head and to cause said material to be extruded through said head, a mold carrier having a plurality of molds mounted thereon, means for driving said mold carrier to move the molds in an endless path and into and out of position beneath the head of said extruder to receive plastic material therefrom, means for periodically raising and lowering the head of said extruder out of and into cooperative relation to said molds, a knife for severing plastic material depending from the head of said extruder, and connections for operating said knife to sever the plastic material in response to the upward movement of said extruder head.

9. A machine for forming articles from organic plastic material comprising an extruder, said extruder including a cylinder and a head, means for forcing plastic material through said cylinder and said head and to cause it to be extruded through said head, a mold for receiving plastic material from said extruder, means for imparting up and down movement to the head of said extruder, a knife for severing plastic material depending from the head of said extruder, and connections for operating said knife in response to the up and down movement of said extruder head.

10. A machine for forming articles from organic plastic material comprising an extruder, said extruder including a cylinder and a head and means for forcing plastic material therethrough to cause such material to be extruded through said head, means for periodically imparting upward movement to said extruder, a mold for receiving plastic material from said extruder head, a knife for severing plastic material depending from the head of said extruder, means for slidably supporting said knife on the extruder, and means for causing said knife to sever said plastic material in response to the upward movement of the extruder comprising a bell crank connected to said knife, a link connected at one end to said bell crank, and a fixed pivot for the other end of said link.

11. A machine for forming articles from organic plastic material comprising an extruder, said extruder including a heating cylinder and a head, a piston for forcing plastic material through said cylinder and said head and to cause it to be extruded through said head, a ram for operating said piston, a valve for controlling the application of pressure fluid to said ram, a mold carrier having a plurality of molds thereon, means for driving said carrier to move the molds in an endless path into and out of position beneath the head of said extruder to receive plastic material therefrom, a motor for driving said carrier, a pump driven by said motor for supplying pressure fluid through said valve for the operation of said ram, means associated with said head for imparting tubular shape to the plastic material extruded through said head, means for successively blowing said tubular material in said molds to form hollow articles therein, and means for successively severing the plastic material received by said molds from plastic material remaining in said head.

12. A machine for forming articles from organic plastic material comprising an extruder, said extruder including a heating cylinder and a head, a piston for forcing plastic material through said cylinder and said head and to cause it to be extruded through said head, a ram for operating said piston, a valve for controlling the application of a pressure fluid to said ram, a mold carrier having a plurality of molds thereon, a Geneva drive for driving said carrier with a step-by-step movement to move the molds successively into position beneath said extruder head to receive plastic therefrom, a motor having driving connections to said Geneva drive, a pump driven by said motor for supplying pressure fluid through said valve to said ram, means associated with said head for imparting tubular shape to the plastic material extruded through said head, means for successively blowing said tubular material to said molds to form hollow articles therein, and means for successively severing the plastic material received by said molds from plastic material remaining in said head.

13. A machine for forming articles from organic plastic material comprising an extruder, such extruder including a heating cylinder and a head, a piston for forcing plastic material through said cylinder and head and to cause said material to be extruded through said head, a ram for actuating said piston, a valve for controlling the application of pressure fluid to said ram, a mold carrier having a plurality of molds mounted thereon, a motor for driving said carrier to move the molds in an endless path into and out of position beneath the head of said extruder to receive plastic material therefrom, a timer, connections from said motor for continuously driving such timer, means operated by said timer to operate said valve to cause said piston to extrude plastic material through the head of said extruder, means associated with said head for imparting tubular shape to the plastic material extruded through said head, means for successively blowing said tubular material in said molds to form hollow articles therein, and means for successively severing the plastic material received by said molds from plastic material remaining in said head.

14. A machine for forming articles from organic plastic material comprising an extruder, means for supporting said extruder for up and down movement, said extruder including a heating cylinder and a head, a piston for forcing plastic material through said cylinder and head and to cause said material to be extruded through said head, a ram for operating said piston, a valve for controlling application of pressure fluid to said ram, a rotary mold carrier having a plurality of molds mounted thereon, a rotary timer for controlling the operation of said valve and said ram, a motor, driving connections from said motor to said rotary carrier and to said timer, and a cam for effecting the up and down movement of said extruder, said cam having a driving connection to said timer.

15. A machine for forming articles from organic plastic material comprising an extruder, means for supporting said extruder for up and down movement, said extruder including a heating cylinder and a head, a piston for forcing plastic material through said cylinder and head and to cause said material to be extruded through said head, a ram for operating said piston, a valve for controlling application of pressure fluid to said ram, a rotary mold carrier having a plurality of molds mounted thereon, a rotary timer for controlling the operation of said valve and said ram, a motor, driving connections from said motor to said rotary carrier and to said timer, a cam for effecting the up and down movement of said extruder, said cam having a driving connection with said timer, and a fluid pressure pump driven by said motor to supply fluid pressure through said valve to said ram.

16. A machine for forming articles from organic plastic material comprising an extruder, said extruder including a heating cylinder and a head, means for forcing plastic material through said cylinder and said head and to cause said material to be extruded through said head, a mold carrier having a plurality of molds mounted thereon, means for driving said carrier to move the molds in an endless path into and out of position beneath the head of said extruder to receive plastic material therefrom, each of said molds being formed in sections mounted for opening and closing movement, and means for successively closing the molds beneath the head of said extruder, said mold closing means including a cam plate, means supporting said plate for oscillatory movement, a mold closing cam carried by said plate, a cam for oscillating said cam plate, and connections to the sections of each of said molds acted on by said mold closing cam to successively close said molds.

17. A machine for forming articles from organic plastic material comprising an extruder, said extruder including a heating cylinder and a head, means for forcing plastic material through said cylinder and said head and to cause such material to be extruded through said head, a mold carrier having a plurality of molds mounted thereon, means for driving said carrier to move the molds in an endless path into and out of position beneath the head of said extruder to receive plastic material therefrom, each of said molds being formed in sections mounted for opening and closing movement, and means for successively closing the molds beneath the head of said extruder, said mold closing means including a cam plate, means supporting said plate for oscillatory movement, a mold closing cam carried by said plate, a cam for oscillating said cam plate, connections to the sections of each of said molds acted on by said mold closing cam to successively close said molds, and a mold opening cam carried by said cam plate and operable upon the connections to the mold sections of the respective molds to successively open the molds at a delivery position upon oscillation of the cam plate.

18. A machine for forming articles from organic plastic material comprising an extruder, said extruder including a heating cylinder and a head, means for forcing plastic material through said cylinder and said head to cause such material to be extruded through said head, a mold carrier having a plurality of molds mounted thereon, means for driving said carrier to move the molds in an endless path into and out of position beneath the head of said extruder to receive plastic material therefrom, each of said molds being formed in sections mounted for opening and closing movement, and means for successively closing the molds beneath the head of said extruder, said mold closing means including a cam plate, means supporting said plate for oscillatory movement, a mold closing cam carried by said plate, a cam for oscillating said cam plate, connections to the sections of each of said molds acted on by said mold closing cam to successively close said molds, a mold opening cam carried by said cam plate and operable upon the connections to the mold sections of the respective molds to successively open the molds at a delivery position upon oscillation of the cam plate, a discharge device located at said delivery position, and a cam carried by said cam plate for actuating said discharge device to successively discharge plastic articles from said molds.

WILLIAM H. KOPITKE.